United States Patent
Shimomura

(10) Patent No.: US 7,522,324 B2
(45) Date of Patent: Apr. 21, 2009

(54) OPTICAL SCANNING DEVICE AND IMAGE FORMING APPARATUS USING THE SAME

(75) Inventor: Hidekazu Shimomura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/962,053

(22) Filed: Dec. 20, 2007

(65) Prior Publication Data

US 2008/0151326 A1   Jun. 26, 2008

(30) Foreign Application Priority Data

Dec. 26, 2006   (JP) ............... 2006-349557

(51) Int. Cl.
  G02B 26/08    (2006.01)
  B41J 27/00    (2006.01)
(52) U.S. Cl. .................. 359/205; 347/259
(58) Field of Classification Search ........... 359/205
  See application file for complete search history.

(56) References Cited

U.S. PATENT DOCUMENTS

| | | | |
|---|---|---|---|
| 3,873,180 A | 3/1975 | Bousky | 350/7 |
| 5,504,613 A | 4/1996 | Itabashi et al. | 359/210 |
| 6,456,415 B1 | 9/2002 | Shikii et al. | 359/205 |
| 6,683,707 B2 | 1/2004 | Ishihara et al. | 359/205 |
| 6,760,138 B2 | 7/2004 | Shimomura | 359/212 |
| 6,774,924 B2 | 8/2004 | Kato et al. | 347/244 |
| 6,803,942 B2 | 10/2004 | Sato et al. | 347/259 |
| 6,831,764 B2 | 12/2004 | Shimomura et al. | 359/207 |
| 6,847,473 B2 | 1/2005 | Inagaki | 359/205 |
| 6,992,807 B2 | 1/2006 | Shimomura | 359/207 |
| 7,034,859 B2 | 4/2006 | Ishihara et al. | 347/244 |
| 7,053,922 B2 | 5/2006 | Kato et al. | 347/244 |

(Continued)

FOREIGN PATENT DOCUMENTS

GB   1567319   5/1980

(Continued)

OTHER PUBLICATIONS

European Search Report dated Apr. 2, 2008, from corresponding European Application No. 07024977.6.

Primary Examiner—James Phan
(74) Attorney, Agent, or Firm—Fitzpatrick, Cella, Harper & Scinto

(57) ABSTRACT

An optical scanning device and an image forming apparatus having the same include a light source, a deflecting system, an imaging optical system with at least one imaging optical element for imaging a light beam deflected by the deflecting system on a surface to be scanned, and at least one reflection type optical element disposed between the imaging optical element and the scanned surface, wherein the deflected light beam passes through a first transmission surface and a second transmission surface of the imaging optical element in this order and, after being reflected by the reflection type optical element, the light beam then passes through a third transmission surfaced and a fourth transmission surface of the imaging optical element in this order, and wherein a relation |øM/ø|<0.1 is satisfied where ø is an axial combined power within a main-scan section of the imaging optical element through which the light beam passes again, and øM is an axial combined power within a main-scan section of the reflection type optical element.

14 Claims, 21 Drawing Sheets

U.S. PATENT DOCUMENTS

| | | | |
|---|---|---|---|
| 7,068,406 B2 | 6/2006 | Shimomura | 359/196 |
| 7,075,690 B2 | 7/2006 | Shimomura | 359/205 |
| 7,190,498 B2 | 3/2007 | Shimomura | 359/205 |
| 7,218,434 B2 | 5/2007 | Shimomura | 359/205 |
| 7,248,279 B2 | 7/2007 | Ishihara et al. | 347/244 |
| 2003/0227660 A1 | 12/2003 | Kim | 359/205 |
| 2005/0168787 A1 | 8/2005 | Iizuka | 359/205 |
| 2006/0164709 A1 | 7/2006 | Tomita et al. | 359/205 |
| 2007/0119935 A1 | 5/2007 | Shimomura | 235/454 |

FOREIGN PATENT DOCUMENTS

| | | |
|---|---|---|
| JP | 61-186921 | 8/1986 |
| JP | 1-9412 | 1/1989 |
| JP | 6-82715 | 3/1994 |
| JP | 8-248308 | 9/1996 |
| JP | 9-68664 | 3/1997 |
| JP | 10-48552 | 2/1998 |
| JP | 10-288745 | 10/1998 |
| JP | 11-52277 | 2/1999 |
| JP | 2001-83445 | 3/2001 |
| JP | 2003-287695 | 10/2003 |

OPTICAL SCANNING DEVICE AND IMAGE FORMING APPARATUS USING THE SAME

FIELD OF THE INVENTION AND RELATED ART

This invention relates to an optical scanning device and an image forming apparatus using the same. The present invention is particularly suitable for image forming apparatuses such as a laser beam printer (LBP), a digital copying machine or a multifunction printer having an electrophotographic process.

Conventionally, optical scanning devices are used in a laser beam printer (LBP), a digital copying machine or a multifunction printer.

In such optical scanning devices, a light flux (light beam) emitted from light source means while being optically modulated in accordance with an image signal, is periodically deflected by an optical deflector which comprises a rotary polygonal mirror (polygon mirror), for example.

Then, by means of an imaging optical system having an fθ characteristic, the deflected light beam is focused into a light spot on the surface of a photosensitive recording medium (photosensitive drum), by which the photosensitive drum surface is optically scanned and image recording is performed.

On the other hand, various proposals have been made with reference to optical scanning devices having an imaging optical system constituted by a single piece of imaging lens, for compactification of the overall system (Patent Documents Nos. 1-5, see below).

FIG. 35 is a schematic diagram of a main portion of a conventional optical scanning device having an imaging optical system constituted by a single piece of imaging lens.

FIG. 36 is a sectional view (main-scan sectional view) of a main portion of the scanning device of FIG. 35, taken along a main-scan direction.

In FIG. 35 and FIG. 36, a single or plural divergent light beams emitted from light source means 1 are converted into a parallel light beam by a collimator lens 3. Then, the light beam is restricted by a stop 2 and, thereafter, it is incident on a cylindrical lens 4 having a predetermined refracting power only in a sub-scan direction.

Within the main-scan section, the parallel light beam incident on the cylindrical lens 4 goes out of the lens without being changed.

On the other hand, within the sub-scan section, the light beam is converged and imaged as a line image on the deflecting surface (reflection surface) 5a of an optical deflector 5 which comprises a polygon mirror.

Then, the light beam deflected by the deflecting surface 5a of the optical deflector 5 is directed toward a photosensitive drum surface 8 (surface to be scanned) through an imaging lens 6 having an fθ characteristic.

By rotating the optical deflector 5 in the direction of an arrow A, the photosensitive drum surface 8 is optically scanned with a single or plural light beams in the direction of an arrow B (main-scan direction), whereby imagewise information is recorded thereon.

Here, in FIG. 35, denoted at 18 is a mirror for synchronization detection, and denoted at 19 is a sensor for synchronization detection. In FIG. 36, denoted at 9 is a motor, and denoted at 10 is a motor base. Denoted at 11 is an optics box, and denoted at 12 is the optical scanning device.

Patent Document No. 4 discloses an optical scanning device using an in-mirror lens as an imaging optical system, in which one surface of a single imaging lens provides a reflection surface.

In this in-mirror lens, the lens thickness (distance between the transmission surface and the reflection surface) is made smaller so as to reduce inconveniences such as inside distortion or enlargement of lens molding time to be caused by molding a thick lens.

Furthermore, by bending the light path, reduction in size of the overall system is attempted.

Patent Document No. 5 shows an optical scanning device in which an optical system after an optical deflector has a transmission surface and a reflection surface each comprising a free-form curved surface. A light beam from the optical deflector and passing through the transmission surface is reflected by the reflection surface, and again it is transmitted through the transmission surface.

[Patent Documents]
1) Japanese Laid-Open Patent Application No. 8-248308
2) Japanese Laid-Open Patent Application No. 10-48552
3) Japanese Laid-Open Patent Application No. 10-288745
4) Japanese Laid-Open Patent Application No. 9-68664
5) Japanese Laid-Open Patent Application No. 2003-287695

Conventional optical scanning devices using a single piece of imaging lens involves several inconveniences to be described below.

Generally, if fθ correction and field-curvature correction are going to be balanced by using one piece of imaging lens, the distance from the deflecting means (optical deflector) to the surface to be scanned (scanned surface) is liable to become longer because of limitedness of design flexibility.

The optical scanning device itself can be made more compact by several methods such as:

(1) Making the optical distance from the deflecting means to the scanned surface shorter; or (2) Folding the light path by using a mirror or the like so that it is fitted to the configuration of the image forming apparatus structure.

With regard to method (1) above, an example is an optical system in which the number of surfaces of the polygon mirror as the deflecting means is reduced and to widen the scan field angle thereby to shorten the light path.

This type of optical system involves a problem of depth of focus at an end portion of the image in the main-scan direction.

When the angle which is defined within the main-scan section and between the principal ray of a light beam incident on the image end portion and a plane perpendicular to the scanned surface is denoted by $\alpha$ (deg), the depth of focus decreases in proportion to $\cos^3 \alpha$.

Generally, if the angle $\alpha$ becomes larger than 40 degrees, it is difficult to control variation of the focus of the imaging lens due to manufacturing errors or variation of the distance between the optical scanning device and the photosensitive drum, within the range of the depth of focus.

Furthermore, if such an optical system is used with a multi-beam laser light source, large jitter would be produced in the main-scan direction as a result of plural light beams obliquely incident on the photosensitive drum surface.

In addition, reducing the number of surfaces of the polygon mirror is disadvantageous from the viewpoint of higher speed operation.

On the other hand, there may be a method in which the number of lenses of the imaging optical system is increased to expand the design flexibility, to thereby shorten the optical path length while keeping the angle $\alpha$.

However, the weight becomes heavier due to the added lenses, and the size becomes bigger.

There may be a further method in which the optical path length is shortened by transforming the light beam to be incident on the deflecting means, from a parallel light beam to a convergent light beam.

However, if a light beam having a strong convergence is incident on the deflecting means, it causes a problem of jitter in the main-scan direction due to the eccentric error of the deflecting surface.

Therefore, in optical scanning devices in which a light beam having a strong convergence is incident, it is inevitable to increase the machining precision for the optical deflector such as a polygon mirror. This makes the manufacture quite difficult.

In method (2) mentioned above, the inconveniences of depth of focus or jitter in the main-scan direction described hereinbefore can be avoided.

However, increases in the number of reflecting mirrors would make the overall system more complicated.

Furthermore, there will be another problem of image degradation such as focus shift due to mirror surface precision or disposition errors, and pitch unevenness due to oscillation of the mirror.

Therefore, even with this method, it is very difficult to produce optical scanning devices which satisfy the image quality and the size evenly.

The in-mirror lens shown in Patent Document No. 4 is comprised of one piece, and the overall system can be made compact.

However, since the power (refracting power) in the main-scan direction is mainly provided by the reflection surface, the disposition sensitivity of the in-mirror lens, particularly, the surface-precision sensitivity and the disposition sensitivity of the reflection surface thereof are liable to be extraordinarily high.

In Patent Document No. 5, the power in the main-scan direction is mainly provided by the reflection surface, as in Patent Document NO. 4. Therefore, it causes inconveniences of very high surface-precision sensitivity and disposition sensitivity of the reflection surface.

Various proposals have been made in addition to Patent Documents Nos. 4 and 5 with respect to optical scanning devices in which a light path is folded by using a curved surface mirror to make the overall system compact.

However, in all these proposals, the power in the main-scan direction concentrates on the curved surface mirror. It is therefore practically very difficult to manufacture the device.

Furthermore, generally in optical scanning devices, if a light beam is incident on an optical deflector in a direction which is oblique with respect to the deflecting surface of the optical deflector within the sub-scan section, the pitch in the sub-scan direction becomes non-uniform due to a shift eccentric error of the deflecting surface.

This necessitates raising the finishing precision of the optical deflector such as a polygon mirror.

SUMMARY OF THE INVENTION

The present invention provides an optical scanning device and/or an image forming apparatus using the same, by which the disposition sensitivity and the surface-precision sensitivity of optical components can be lowered and the overall system can be reduced in size.

The present invention provides an optical scanning device and/or an image forming apparatus using the same, by which high-quality images can be produced at higher speed.

In accordance with an aspect of the present invention, there is provided an optical scanning device, comprising: light source means; deflecting means having a deflecting surface; an input optical system configured to direct a light beam emitted from said light source means onto said deflecting means; an imaging optical system configured to image a light beam scanningly deflected by the deflecting surface of said deflecting means upon a surface to be scanned, said imaging optical system having at least one imaging optical element of transmission type; and at least one reflection type optical element having a reflecting surface and being disposed at an optical path between said at least one imaging optical element and the scanned surface; wherein said at least one imaging optical element has first to fourth transmission surfaces and is configured so that the light beam scanningly deflected by the deflecting surface of said deflecting means passes through said at least one imaging optical element in an order from the first transmission surface to the second transmission surface, and that, after being reflected by the reflecting surface of said at least one reflection type optical element, the light beam subsequently passes again through said at least one imaging optical element in an order from the third transmission surface to the fourth transmission surface, wherein said at least one imaging optical element through which the light beam passes again has an axial combined power ø within a main-scan section, while the reflecting surface of said at least one reflection type optical element has an axial combined power øM within a main-scan section of the reflecting surface, which axial combined powers satisfy a relation $$|øM/ø|<0.1$$

and, wherein the axial combined power of said at least one imaging optical element through which the light beam passes again is comprised of combined powers of four optical surfaces which include the first transmission surface on which the light beam scanningly deflected by the deflecting surface of said deflecting means is incident, the second transmission surface on which the light beam passed through the first transmission surface is incident, the third transmission surface on which the light beam reflected by the reflecting surface of said at least one reflection type optical element is incident, and the fourth transmission surface on which the light beam passed through the third transmission surface is incident.

In one preferred form of this aspect of the present invention, the or all of said reflection type optical elements are comprised of a plan mirror.

When an effective width of an image on the scanned surface in a main-scan direction is denoted by W (mm), a distance to the scanned surface from the or one reflection type optical element which is optically farthest from the scanned surface is denoted by L (mm), and an angle which is defined within the main-scan section and between a principal ray of a light beam incident on an image end portion on the scanned surface and a normal which is perpendicular to the scanned surface is denoted by α (deg), a relation $$20°<α·W/L<100°$$

may be satisfied.

The optical scanning device may have only one imaging optical element of transmission type through which the light beam passes again.

The surface, at the deflecting means side, of said imaging optical element through which the light beam passes again may have a shape having different powers with respect to the sub-scan section, the power being different between a position where the light beam deflected by the deflecting surface of said deflecting means passes and a position where the light beam reflected by the reflecting surface of said at least one reflection type optical element passes.

The first transmission surface and the third transmission surface of said imaging optical element through which the light beam passes again may have a shape in the main-scan section which is defined based on one function, and the second transmission surface and the fourth transmission surface of said imaging optical element may have a shape in the main-scan section which is defined based on one function.

The first transmission surface and the second transmission surface of said imaging optical element through which the light beam passes again may have an axial combined power øL in the main-scan section, while the first transmission surface of said imaging optical element through which the light beam passes again may have an axial power ø1 in the main-scan section, and a relation $$-2.0 < ø1/øL < 0.5$$

may be satisfied.

The imaging optical element through which the light beam passes again may have a surface with a sign of curvature, in the main-scan section, which sign is inverted within an effective diameter.

The surface of said imaging optical element with an inverting sign may have an axial shape which is convex facing to the deflecting means side.

When a distance in the main-scan section from a rear principal plane of said imaging optical system to the scanned surface is denoted by Sk (mm), a focal length of said imaging optical system within the main-scan section is denoted by f (mm), and m=1−Sk/f, a relation $$-0.1 < m < 0.5$$

may be satisfied.

Within the sub-scan section, the light beam from said input optical system may be perpendicularly incident on the deflecting surface of said deflecting means.

When an angle which is defined in the sub-scan section and between a rotational axis of said deflecting means and the or a reflecting surface of the or one reflection type optical element disposed at a position farthest from said imaging optical element through which the light beam passes again, is denoted by β (deg), a relation $$2° \leq β \leq 10°$$

may be satisfied.

When an angle which is defined in the main-scan section and between an optical axis of said imaging optical system and a principal ray of the light beam incident on the deflecting surface of said deflecting means is denoted by Y (deg), a relation $$60° \leq Y \leq 90°$$

may be satisfied.

In accordance with another aspect of the present invention, there is provided an image forming apparatus, comprising: an optical scanning device as recited above; a photosensitive material disposed at a scan surface to be scanned; a developing device for developing an electrostatic latent image formed on said photosensitive material through a light beam scanned by said optical scanning device, to produce a toner image; a transferring device for transferring the developed toner image onto a transfer material; and a fixing device for fixing the transferred toner image, on the transfer material.

In accordance with a further aspect of the present invention, there is provided an image forming apparatus, comprising: an optical scanning device as recited above; and a printer controller for converting code data supplied from an outside machine into an imagewise signal and for inputting the imagewise signal into said optical scanning device.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

Embodiment 1

Figure 1:
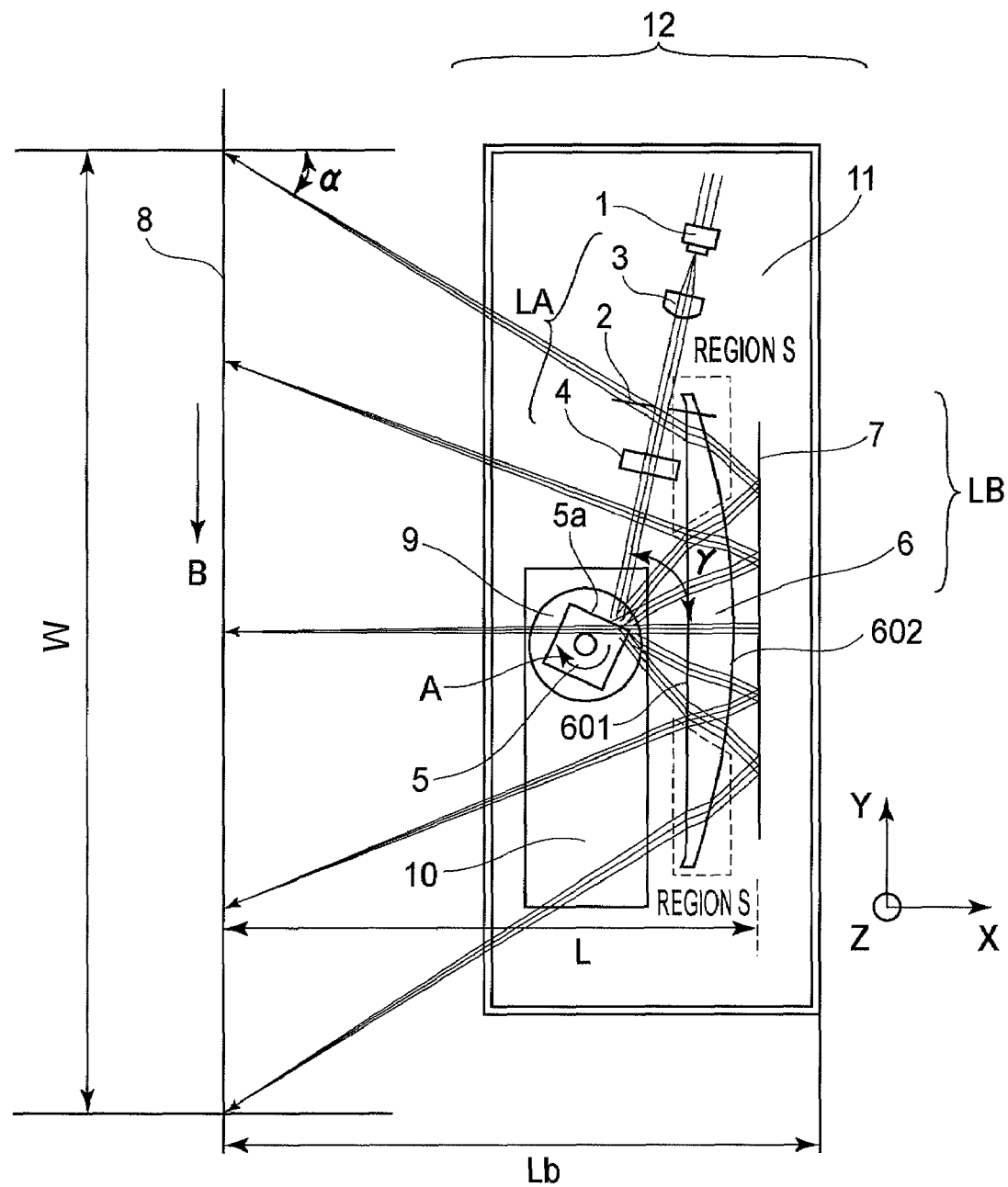
FIG. 1 is a sectional view, along a main-scan section, of an optical scanning device according to a first embodiment of the present invention.

FIG. 1 is a sectional view in the main-scan direction (main-scan sectional view) of a main portion of a first embodiment of the present invention.

In the following description for preferred embodiments of the present invention, the words "optical axis" or "axial" for an imaging optical system are used to refer to an axis which extends in a direction perpendicular to the scan surface (surface to be scanned) and crosses at the center of the scan surface. In other words, the words "optical axis" or "axial" refer to an axis passing through the lens surface vertex of the imaging optical element and extending in a direction perpendicular to the scan surface.

On the other hand, the term "main-scan direction" (Y-direction) refers to a direction which is perpendicular to the rotational axis of deflecting means and the optical axis (X-direction) of an imaging optical system, that is, the direction in which a light beam is reflectively deflected (scanningly deflected) by the deflecting means.

The term "sub-scan direction" (Z-direction) refers to a direction which is parallel to the rotational axis of the deflecting means.

The term "main-scan section" refers to a plane which contains the optical axis and the main-scan direction.

The term "sub-scan section" refers to a cross-section which is perpendicular to main-scan section.

Referring to the drawing, denoted in FIG. 1 at 1 is light source means which comprises a semiconductor laser, for example. Denoted at 3 is a condenser lens (a collimator lens) which converts a divergent light beam emitted from the light source means 1 into a slow-convergence light beam. It is to be noted here that the condenser lens 3 may convert the incident light beam into a parallel light beam or a divergent light beam, not the convergent light beam.

Denoted at 2 is an aperture stop which restricts the light beam passing therethrough to shape the beam profile. Denoted at 4 is a lens system (cylindrical lens) having a predetermined power only in the sub-scan section (sub-scan direction). It serves to image, in the sub-scan section into a line image, the light beam passed through the aperture stop 2, upon the deflecting surface (reflection surface) 5a of the optical deflector 5 to be described below.

The condenser lens 3 and the cylindrical lens 4 may be constituted integrally as one optical element (anamorphic lens).

The condenser lens 3, aperture stop 2 and cylindrical lens 4 are components of an input optical system (condensing optical system) LA.

Denoted at 5 is an optical deflector (polygon mirror) as deflecting means which is rotated at a constant speed in a direction of an arrow A in the drawing, by driving means (not shown) such as a motor, for example.

Denoted at LB is an imaging optical system which includes a single piece of imaging lens (plastic lens) 6 as an imaging optical element of transmission type, having an fθ characteristic, and one piece of mirror 7 as a reflecting optical element.

The imaging optical element of transmission type may include a dioptric element and a diffractive optical element, for example. However, in this embodiment, it is comprised of all dioptric elements.

The mirror 7 in the present embodiment comprises a plane mirror having no power both in the main-scan direction and the sub-scan direction.

Here, the imaging optical system LB may be constituted to have a plurality of imaging optical elements of transmission type and a plurality of reflection type optical elements.

The imaging optical system LB functions to image the light beam based on imagewise information and scanningly deflected by the optical deflector 5, into a spot upon the photosensitive drum surface 8 (surface to be scanned) with respect to the main-scan section (main-scan direction).

Furthermore, an optically conjugate relationship is provided between the deflecting surface 5a of the optical deflector 5 and the photosensitive drum surface 8 in the sub-scan section, by which surface tilt correction is accomplished.

Here, if the optical deflector is formed with a plurality of deflecting surfaces as of a polygon mirror, these deflecting surfaces have different tilt angles with respect to the sub-scan direction. Hence, a surface tilt correcting optical system is generally used.

Denoted at 8 is the photosensitive drum surface as the scanned surface, and denoted at 9 is a motor. Denoted at 10 is a motor base, and denoted at 11 is an optics box. Denoted at 12 is an optical scanning device.

In the present embodiment, a divergent light beam emitted from a semiconductor laser 1 is converted into a slow-convergence light beam by the condenser lens 3. Then, the light beam (light quantity) is restricted by the aperture stop 2, and then it is incident on the cylindrical lens 4.

Within the main-scan section, the parallel light beam incident on the cylindrical lens 4 goes out of the lens without being changed, and then it is incident on the deflecting surface 5a of the optical deflector 5.

Here, the light beam is so incident on the deflecting surface 5a that the angle γ defined between the optical axis of the imaging lens 6 and the principal ray of the light beam is γ=78 deg.

Furthermore, within the sub-scan section, the light beam is further converged and imaged as a line image (line image being elongated in the main-scan direction) on the deflecting surface 5a of the optical deflector 5. Here, the light beam is incident on the deflecting surface 5a in a direction perpendicular to the deflecting surface 5a of the optical deflector 5.

Then, the light beam reflectively deflected by the deflecting surface 5a of the optical deflector 5 passes through the imaging lens 6, and it is reflected by the plane mirror 7. Subsequently, the light beam is incident again on the imaging lens 6 in a direction opposite to the initial incidence direction.

Then, the light beam passes through the imaging lens 6 and is imaged into a spot shape on the photosensitive drum surface 8. By rotating the optical deflector 5 in the direction of an arrow A, the photosensitive drum surface 8 is optically scanned at a constant speed in the direction of an arrow B (main-scan direction).

With this procedure, image recording is carried out on the photosensitive drum surface 8 as a recording medium.

In the present embodiment, as described above, the light beam deflected by the deflecting surface 5a of the optical deflector 5 once passes through the imaging lens 6 and, after being turned back by the plane mirror 7, the light beam again passes through the imaging lens 6 from a direction opposite to the original incidence direction.

With this arrangement, in the present embodiment, the overall system is compactified.

Figure 2:
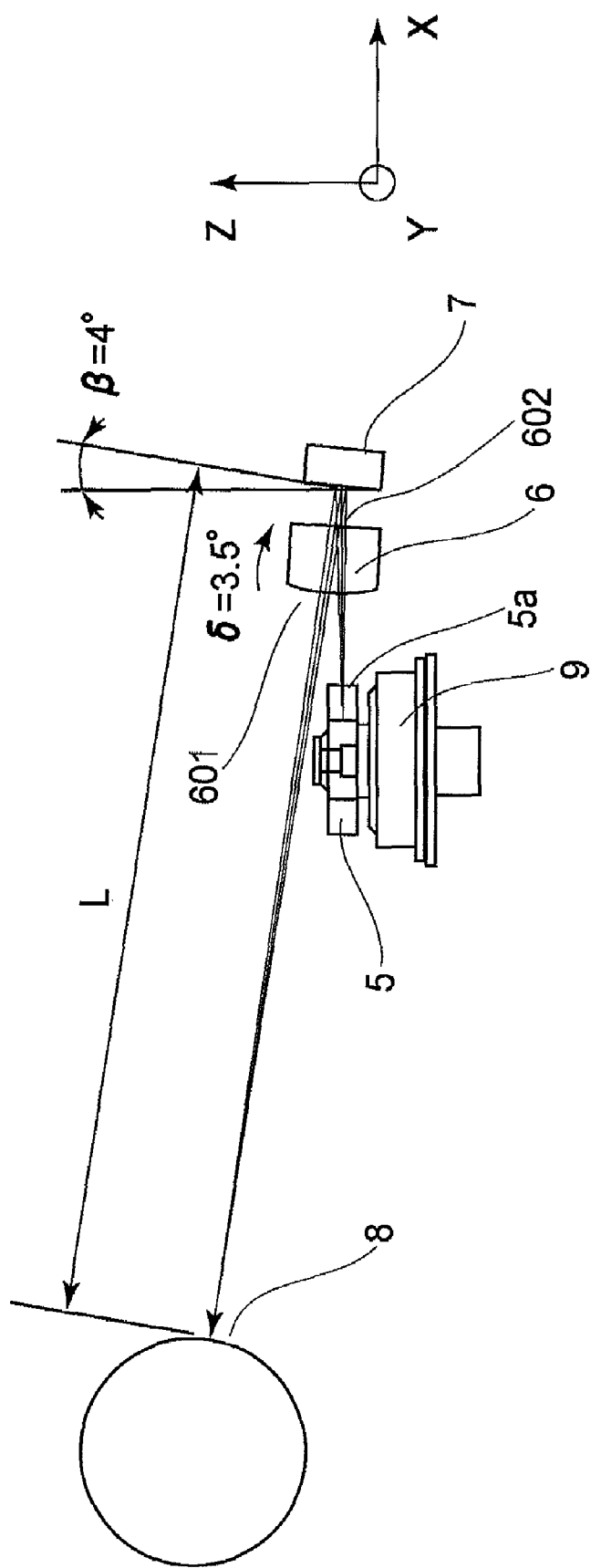
FIG. 2 is a sectional view, along a sub-scan section, of the optical scanning device according to the first embodiment of the present invention.

FIG. 2 is a sectional view in the sub-scan direction (sub-scan sectional view) of a main portion of the first embodiment of the present invention.

In FIG. 2, like numerals are assigned to components corresponding to those of FIG. 1.

Within the main-scan section, the light beam (deflection light beam) impinging on the deflecting surface 5a is incident therewith an angle γ=78 deg. as described above. On the other hand, within the sub-scan section, the light beam is incident on the deflecting surface 5a in a direction perpendicular to it.

Since the light beam is made incident on the deflecting surface 5a from a perpendicular direction, pitch unevenness due to shift decentering of the deflecting surface 5a is theoretically avoided.

Furthermore, in this embodiment as shown in FIG. 2, the plane mirror 7 is disposed with a tilt β=4 deg. in the sub-scan direction, with respect to the rotational axis of the optical deflector 5. With this arrangement, the light beam reflected by the plane mirror 7 can be directed to the scan surface 8 without interfering with the optical deflector 5.

Table 1 below shows the lens form and optics configuration according to the present embodiment.

TABLE 1

TABLE 1: DESIGN DATA

| Wavelength & Refractive Index | | |
|---|---|---|
| Used Wavelength | λ (nm) | 790 |
| Lens Refractive Index | n | 1.52781 |
| Disposition | | |
| Main-Scan Laser Incidence Angle (deg) | γ | 78 |
| Sub-Scan Laser Incidence Angle (deg) | | 0 |
| Light Ray Max. Emission Angle (deg) | | +/−52.5 |
| Polygon Rotational Center Coordinates (mm) | Y-direction | −5.91 |
|  | X-direction | −3.938 |
| No. of Polygon Surfaces | | 4 |
| Polygon Circumscribing Diameter (mm) | | φ20 |
| Effective Scan Width | W | 220 |
| fθ Coefficient | k (rad/mm) | 120 |

| | Lens Disposition | | |
|---|---|---|---|
| | X-direction | Y-direction | Z-direction |
| Lens Entrance Surface 601 | 16.130 | 0.000 | 1.500 |
| Lens Exit Surface 602 | 25.792 | 0.000 | 0.909 |
| Mirror Surface 7 | 31.100 | 0.000 | 0.000 |
| Lens Re-entrance Surface 60 | 25.792 | 0.000 | 0.909 |
| Lens Re-exit surface 601 | 16.130 | 0.000 | 1.500 |
| Scanned Surface 8 | −83.663 | 0.000 | 17.732 |

TABLE 1-continued

| | Aspherical Surface Data (Main-Scan Direction) | | | Aspherical Surface Data (Sub-Scan Direction) | |
|---|---|---|---|---|---|
| | Entrance Surface 601 | Exit Surface 602 | | Entrance Surface 601 | Exit Surface 602 |
| R | −3.20652E+02 | −1.02648E+02 | r0 | 1.87299E+01 | 8.33190E+03 |
| K | 1.58658E+01 | −1.61521E+01 | D2s | 5.41671E−04 | 1.40027E−01 |
| B4s | 2.16839E−06 | 9.34736E−07 | D4s | −1.63933E−07 | −3.74097E−04 |
| B6s | −8.93463E−10 | −6.75388E−10 | D6s | 7.24160E−11 | −2.23400E−07 |
| B8s | 1.61039E−13 | 1.68638E−13 | D8s | −3.21277E−15 | 4.71239E−10 |
| B10s | −2.28916E−17 | −2.45431E−17 | D10s | 1.35844E−19 | 7.26067E−13 |
| B4e | 1.99901E−06 | 7.99796E−07 | D2e | 6.42471E−04 | −1.25220E−03 |
| B6e | −8.74827E−10 | −6.26022E−10 | D4e | −2.79446E−07 | 5.58817E−07 |
| B8e | 1.80484E−13 | 1.75543E−13 | D6e | 1.64973E−10 | 7.83054E−11 |
| B10e | −1.96520E−17 | −2.26047E−17 | D8e | −3.09496E−14 | −4.84524E−15 |
| | | | D10e | 8.07627E−19 | 3.63918E−17 |

(Subscript "s" means the surface is at the laser side.)
(Subscript "e" means the surface is at the side remote from the laser.)

Meridional Function

| | Entrance Surface 601 | Exit Surface 602 |
|---|---|---|
| A0-A5 | 0 | 0 |
| A6 | 5.00000E−12 | 0 |
| A7-A9 | 0 | 0 |
| A10 | 4.00000E−19 | 0 |

The meridional shapes of the lens entrance surface 601 of the imaging lens 6 at the optical deflector 5 side and of the lens exit surface 602 thereof at the plane mirror 7 side are constituted by an aspherical surface shape which can be represented by a function up to the tenth order.

Where the point of intersection between the respective lens surfaces of the imaging lens 6 and the optical axis of the imaging lens 6 is taken as an origin and when the optical axis direction is taken as an X-axis while an axis orthogonal to the optical axis in the main-scan section is taken as a Y-axis, the meridional direction corresponding to the main-scan direction is represented by the following equation.

$$X = \frac{Y^2/R}{1 + (1 - (1+K)(Y/R)^2)^{1/2}} + B_4 Y^4 + B_6 Y^6 + B_8 Y^8 + B_{10} Y^{10}$$

where R is the meridional curvature radius and K, B4, B6, B8, and B10 are aspherical coefficients.

With regard to the aspherical coefficients B4, B6, B8 and B10, they may have different numerical values between those (B4s, B6s, B8s and B10s) at the side where the semiconductor laser 1 of the optical scanning device is placed and those (B4e, B6e, Be and B10e) at the side where the semiconductor laser 1 is not disposed. In that occasion, an asymmetrical shape with respect to the main-scan direction can be expressed.

Furthermore, the meridional line that links sagittal apexes together is curved in accordance with a function to be defined below. Here, the origin of Z is taken at the point of intersection between the deflecting surface 5a and the principal ray of the incident light beam.

$$Z = \sum_{i=0}^{n} A_i Y^i$$

Furthermore, the sagittal direction corresponding to the sub-scan direction is expressed by the following equation.

$$S = \frac{\frac{Z^2}{Rs^*}}{1 + \sqrt{1 - \left(\frac{Z}{Rs^*}\right)^2}}$$

Here, S denotes the sagittal shape defined within a plane which contains a normal to the meridional line at each position in the meridional direction and which is perpendicular to the main-scan plane.

Also, the curvature radius (sagittal curvature radius) Rs* in the sub-scan direction at a position spaced by Y from the optical axis in the main-scan direction is expressed by the following equation.

$$Rs^* = Rs \times (1 + D2 \times Y^2 + D4 \times Y^4 + D6 \times Y^6 + D8 \times Y^8 + D10 \times Y^{10})$$

where Rs is the sagittal curvature radius on the optical axis, and D2, D4, D6, D8 and D10 are sagittal coefficient of variation.

Like the main-scan shape, with regard to the aspherical coefficients D2, D4, D6, D8 and D10, they may have different numerical values between those (D2s, D4s, D6s, D8s and D10s) at the side where the semiconductor laser 1 of the optical scanning device is placed and those (D2e, D4e, D6e, D8e and D10e) at the side where the semiconductor laser 1 is not disposed. Based on this, an asymmetrical shape with respect to the main-scan direction can be expressed.

In this embodiment, as seen from Table 1, the shape of the lens entrance surface 601 of the imaging lens at the optical deflector 5 side and of the lens exit surface 602 thereof at the plane mirror 7 side, with respect to the main-scan direction, is determined in accordance with one function described above.

In the present embodiment, the lens entrance surface 601 of the imaging lens 6 at the optical deflector 5 side is comprised of a first transmission surface and a fourth transmission surface. On the other hand, the lens exit surface 602 at the plane mirror 7 side is comprised of a second transmission surface and a third transmission surface.

In this embodiment, the light beam is refracted by all four lens surfaces: that is, a first transmission surface constituting the lens entrance surface 601, a second transmission surface constituting the lens exit surface 602, a third transmission surface constituting the lens entrance surface 602 (lens re-entrance surface), and a fourth transmission surface constituting the lens exit surface 601 (lens re-exit surface).

In the present invention, these four surfaces, that is, lens entrance surface (first transmission surface) 601, lens exit surface (second transmission surface) 602, lens re-entrance surface (third transmission surface) 602, and lens re-exit surface (fourth transmission surface) 601, may be constituted by the surfaces which are defined independently from each other.

In that occasion, a large surface level difference may be produced on the lens exit surface 601 which is at the optical deflector 5 side and the lens exit surface 602 which is at the plane mirror 7 side. Particularly, if the shapes of them in the main-scan direction are optimized individually, a large surface level difference will be produced.

In consideration of this, in the present embodiment, at least with respect to the main-scan direction, a lens shape based on one function including coefficients is adopted.

It should be noted here that, although in the present embodiment the function is defined in accordance with equations mentioned above, the present invention is not limited to this.

In the present embodiment, an infrared radiation source which emits a light beam at an emission wavelength $\lambda=790$ nm, is used as the light source means 1.

Furthermore, the proportionality coefficient $\kappa$ ($Y=\kappa\theta$) for the image height Y and the deflective reflection angle $\theta$ is $\kappa=120$ (rad/mm).

Figure 3:
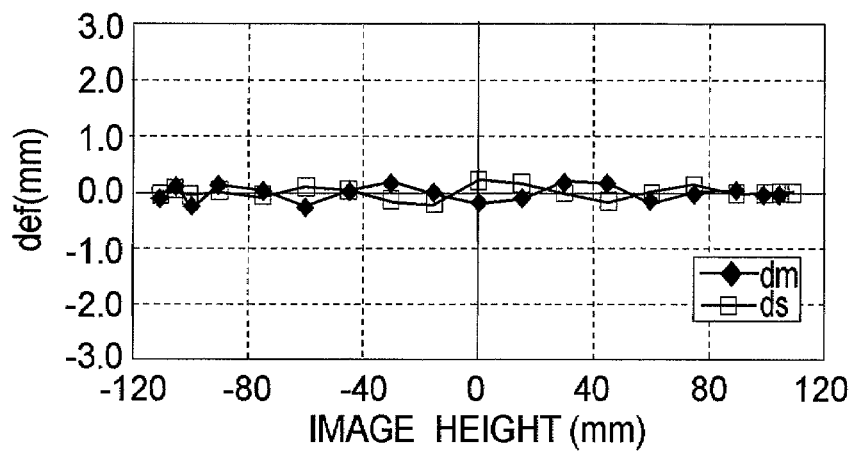
FIG. 3 is a graph depicting a field curvature of the first embodiment of the present invention.

FIG. 3 is a graph depicting the field curvature in the main-scan direction and the sub-scan direction, in the first embodiment of the present invention.

Denoted in FIG. 3 at dm is the field curvature in the main-scan direction, and denoted at ds is the field curvature in the sub-scan direction.

In the effective width (W=220 mm) of the image, the field curvature in the main-scan direction is 0.42 mm, and the field curvature in the sub-scan direction is 0.43 mm. Thus, it is seen that these field curvature are well decreased.

Figure 4:
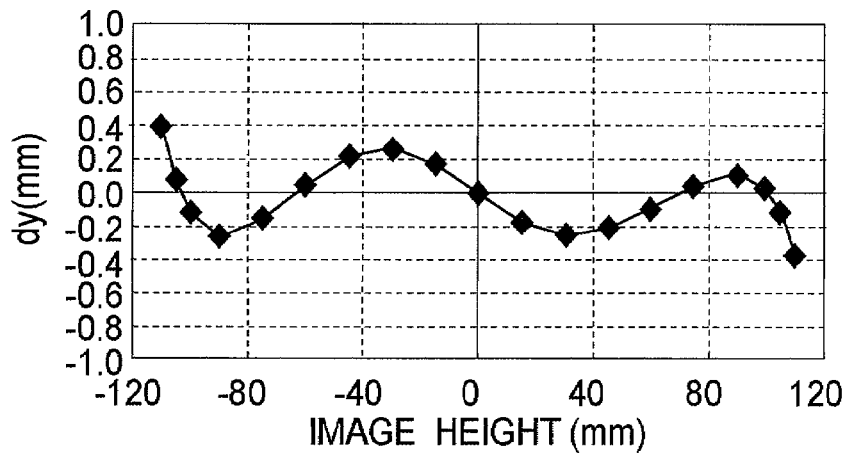
FIG. 4 is a graph depicting an fθ characteristic of the first embodiment of the present invention.

FIG. 4 is a graph depicting the fθ characteristic of the first embodiment of the present invention. FIG. 4 shows the difference obtained by subtracting an ideal image height from the position where the light beam actually impinges.

It is seen that there is a deviation which is 0.396 mm at the maximum. Although this value is slightly too large to use, the fθ characteristic itself can be reduced by changing the image clock in accordance with each image height.

However, if the deviation of the fθ characteristic is too large, then the spot diameter itself in the main-scan direction will change.

In this embodiment, the fθ characteristic is at a satisfactory level with respect to the spot diameter which is influential to the depth of the latent image.

Figure 5:
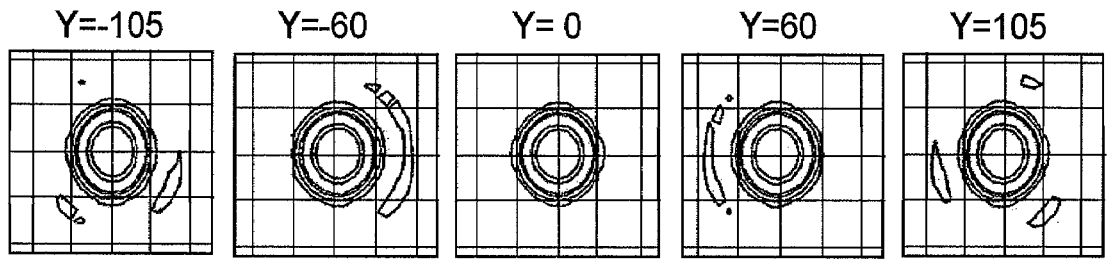
FIG. 5 is a diagram for explaining a spot profile of the first embodiment of the present invention.

FIG. 5 is a schematic diagram which illustrates the cross-sectional shapes of spots at different image heights. More specifically, FIG. 5 illustrates the sections sliced at 2%, 5%, 10%, 13.5%, 36.8% and 50% of the spot peak light quantity, at each image height.

Generally, in optical scanning devices in which a light beam is incident from an oblique direction within the sub-scan section, there occurs a phenomenon that the spot rotates due to distortion of the wavefront aberration.

In the present embodiment, such distortion of the wavefront aberration is reduced by optimizing the power disposition of the lens surfaces, tilt amount and shift amount of the lens, as well as the amount of curve of the meridional in the sub-scan direction.

With regard to the tilt amount of the imaging lens 6, when the point of intersection between the deflecting surface 5a and the principal ray of the incident light beam is taken as an origin, the lens is tilted by $\delta=3.5$ degrees in the sub-scan direction around a coordinate (16.130, 0.000, 1.500), as shown by an arrow in FIG. 2.

Figure 6:
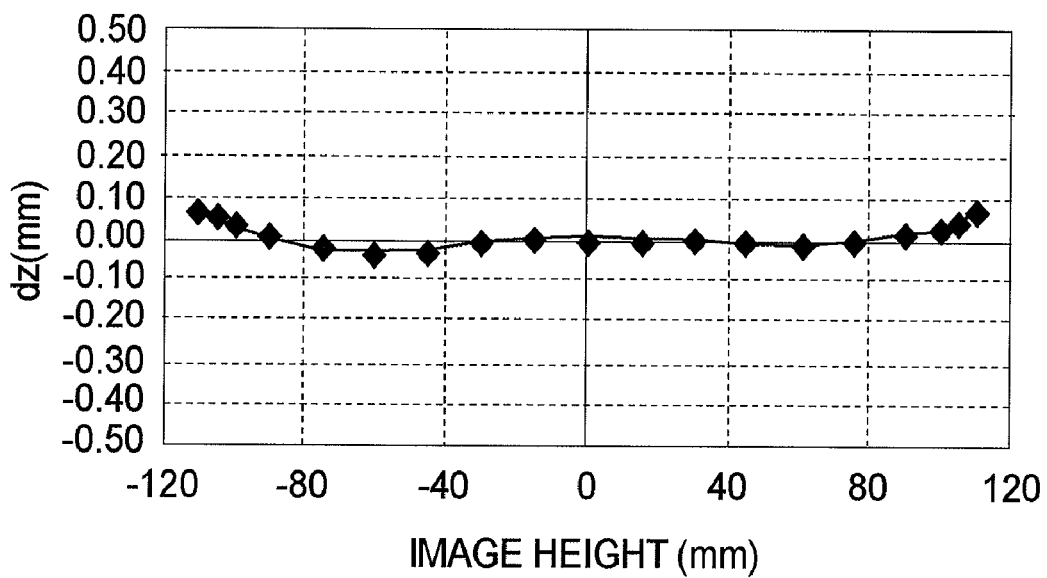
FIG. 6 is a graph depicting scan line bend of the first embodiment of the present invention.

FIG. 6 is a graph depicting the scan line curve which arrives at the scan surface, in the first embodiment of the present invention.

Generally, in monochromatic image forming apparatuses, the scan line curve should be controlled to less than 0.2 mm. In the present embodiment, the scan line curve is held down to 0.106 mm which is a satisfactorily low level.

In this embodiment as described above, the light beam passed through the imaging lens 6 is turned back by the plane mirror 7 SO that it again passes through the imaging lens 6. With this arrangement, the optical scanning device as a whole can be made compact.

Making the overall optical scanning device compact is equal to shortening the distance Lb from the end of an optics box 11 shown in FIG. 1 to the scan surface 8.

In the present embodiment, the distance Lb=114.8 mm. Thus, a very compact optical scanning device is realized.

Figure 36:
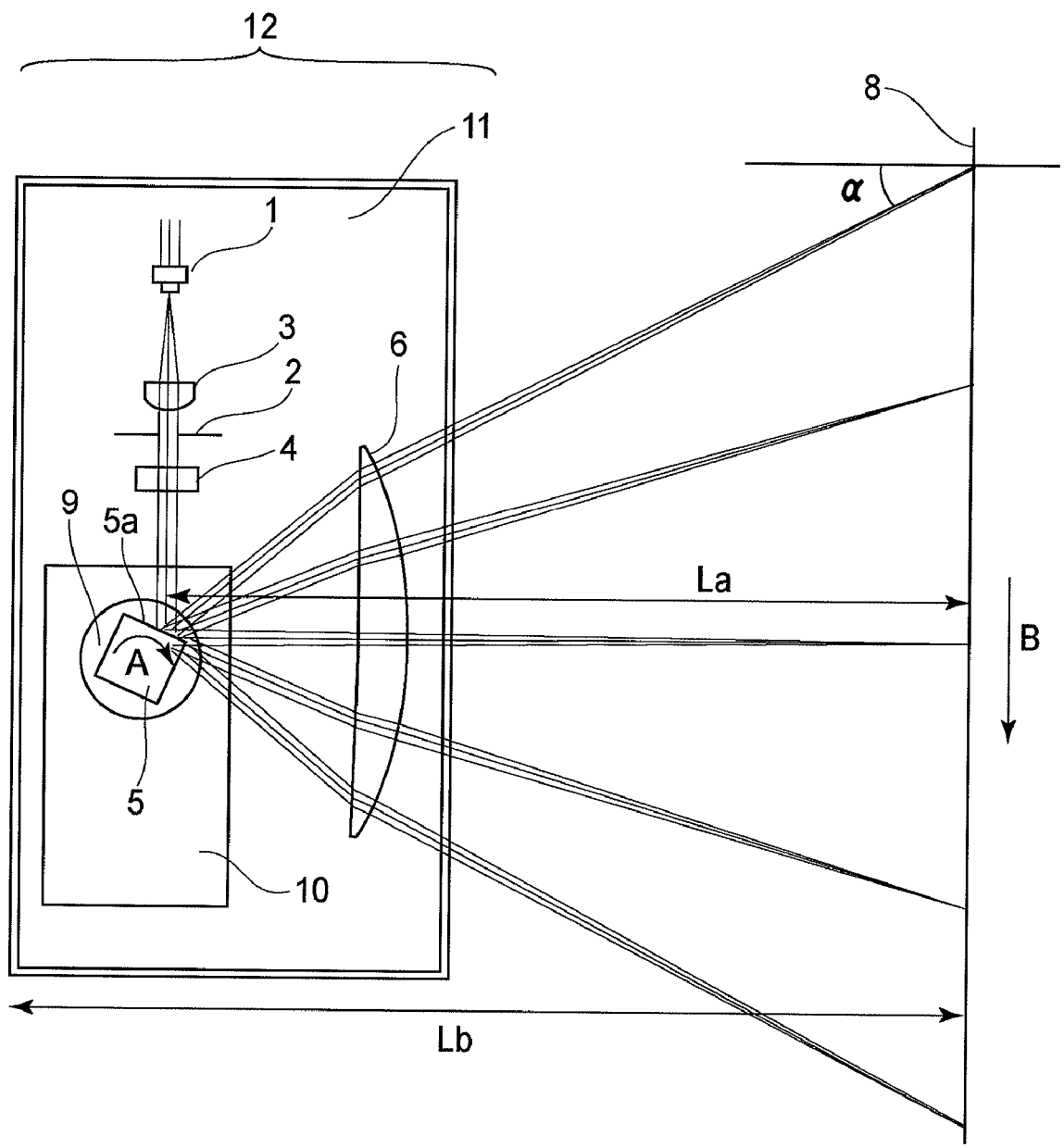
FIG. 36 is a sectional view, along the main-scan section, of a conventional optical scanning device.

Conventionally, on the other hand, since a driving motor 9 of the optical deflector or the driving motor base plate 10 projects out of the light path, the distance Lb can not be shortened (see FIG. 36).

In accordance with the present embodiment, to the contrary, such mechanical components can be placed inside the light path. Thus, the device can be made very compact as compared with conventional structures.

In the present embodiment, when the axial combined power of the imaging lens 6 within the main-scan section is denoted by ø and the axial power of the mirror 7 within the main-scan section is øM, the following condition is satisfied.

$$|\text{ø}M/\text{ø}|<0.1 \tag{1}$$

Here, the axial combined power of the imaging lens 6 in the main-scan section is provided by the combined powers of four optical surfaces: that is, first transmission surface on which the light beam scanningly deflected by the deflecting surface of the optical deflector 5 is incident; second transmission surface on which the light beam passed through the first transmission surface is incident; third transmission surface 602 on which the light beam reflected by the reflection surface of the plane mirror 7 is again incident; and fourth transmission surface 601 on which the light beam passed through the third transmission surface 602 is again incident.

Conditional expression (1) concerns the ratio between the axial combined power ø of the imaging lens 6 in the main-scan section and the axial combined power øM of the mirror 7 in the main-scan section.

If conditional expression (1) is unsatisfied, the power of the mirror 7 becomes too strong such that, due to a disposition error or surface precision error, the performance will be largely deteriorated to cause focus shift, distortion of wavefront aberration or fθ characteristic error. This is undesirable.

Therefore, even if a curved surface mirror 7 is used in place of the plane mirror 7, it is important from the standpoint of manufacture to control the power ratio within the range of conditional expression (1).

The plane mirror 7 of the present embodiment comprises a flat surface mirror which has no power both in the main-scan direction and the sub-scan direction as described above. Hence, there is a relation $$|\phi M/\phi|=0$$

and this satisfies conditional expression (1).

Furthermore, conditional expression (1) may more preferably be set as follows.

$$|\phi M/\phi|<0.05 \tag{1a}$$

In the present embodiment, the light beam passed through the imaging lens is turned back by the plane mirror 7, and a single piece of imaging lens is used so that the mirror-reflected light beam again enters the imaging lens. However, the present invention is not limited to one piece of lens.

Namely, in this embodiment, two ore more pieces of lenses may be used for that the light beam passed through the imaging lens and turned back by the plane mirror 7 is again incident on the imaging lens.

If two or more pieces of lenses are used for the re-incidence of light on the imaging lens, ø in conditional expression (1) may be defined as follows.

In the present embodiment, a single piece of plane mirror is used to assure that the light beam passed through the imaging lens is again incident on the imaging lens. However, the present invention is not limited to one piece of mirror.

Namely, in this embodiment, two ore more pieces of plane mirrors may be used to assure that the light beam passed through the imaging lens is again incident on the imaging lens.

If two or more pieces of plane mirrors are used to ensure that the light beam passed through the imaging lens is again incident on the imaging lens, øM in conditional expression (1) may be defined as follows.

Furthermore, generally, the plane mirror 7 is made of a flat glass plate having a thickness around 5 mm. Thus, the mirror can be conveniently made by, for example, depositing a material such as aluminum or chrome on the surface of a flat glass of about "A4" size and by cutting the glass plate into several pieces of mirrors of elongated shape.

Hence, use of a plane mirror is advantageous not only in the a point of reduction of sensitivity such as disposition or surface precision but also in the point of manufacture.

Furthermore, in the present embodiment, the scanning device is so structured that, within the main-scan section, the angle α defined between the principal ray of the light beam incident on the image end portion and the plane perpendicular to the scanned surface 8 becomes small.

With this arrangement, a sufficient depth of focus in the main-scan direction is secured at the image end portion.

In the present embodiment, if the effective width of an image in the main-scan direction on the scan surface 8, to be formed by the light beam passed through the imaging optical system LB, is denoted by W (mm), the distance along the axial light beam to the scanned surface 8 from one plane mirror 7 which is optically farthest from the scanned surface 8 is denoted by L (mm), and the angle defined in the main-scan section between the principal ray of the light beam which is incident on the image end portion of the scan surface 8 and a normal which is perpendicular to the scan surface 8 is denoted by α (deg), the following condition is satisfied.

$$20° < \alpha \cdot W/L < 100° \tag{2}$$

is satisfied.

It should be noted here that, in this specification, the word "optically" is used also to refer to "in the state as the light path is developed".

Conditional expression (2) defines a condition for securing the depth of focus in the main-scan direction at the image end portion while assuring compactification of the overall system at the same time.

If the lower limit of conditional expression (2) is exceeded, the optical scanning device itself cannot be compact. An optical scanning device of such big size can be accomplished even without the structure of the present embodiment. Hence, it is undesirable.

If the upper limit of conditional expression (2) is exceeded, although the optical scanning device itself becomes sufficiently compact, the depth at the image end portion undesirably decreases a lot.

As described above, since the depth of focus is proportional to $\cos^3 \alpha$, if the upper limit of conditional expression (2) is exceeded, the depth decreases extremely. This is undesirable.

In this embodiment, the angle α=31.4 degrees, the effective width W of the image is W=220 mm, and the distance L from the plane mirror 7 to the scanned surface 8 along the axial light beam is L=116.1 mm. As a result, there is a relation $$\alpha \cdot W/L = 59.5 \text{ deg.}$$

and this satisfies conditional expression (2).

Furthermore, conditional expression (2) may more preferably be set as follows.

$$30° < \alpha \cdot W/L < 90° \tag{2a}$$

Furthermore, in this embodiment, from the viewpoint of compactification and reduction in size, only one piece of imaging lens 6 is used.

Namely, the imaging lens 6 through which the light beam passes twice comprises a single piece of lens.

On the other hand, an optical scanning device of the same size as the present embodiment is very difficult to accomplish if the imaging optical system is conventional wherein the light beam passes a single piece of imaging lens only once.

Despite use of one piece of imaging lens 6, the present embodiment secures a wide design flexibility the same as an imaging optical system which comprises two pieces of imaging lenses, based on making the light beam pass through the lens twice. Particularly, from the intermediate image region to the end image region, there is a region in which the light beam passes only once (i.e., the region S surrounded by a dotted line in FIG. 1).

Since the light beam passes twice at the axial region, the lens surface has to be designed while taking into account both of the first-incidence light beam and the second-incidence light beam. However, with regard to the lens surface in the region S, it can be optimized only with respect to the light beam which is turned back by the plane mirror 7.

This is equivalent to that, from the intermediate image region to the end image region where aberration correction is particularly difficult, the same design flexibility as provided by using two pieces of imaging lenses is secured.

Figure 7:
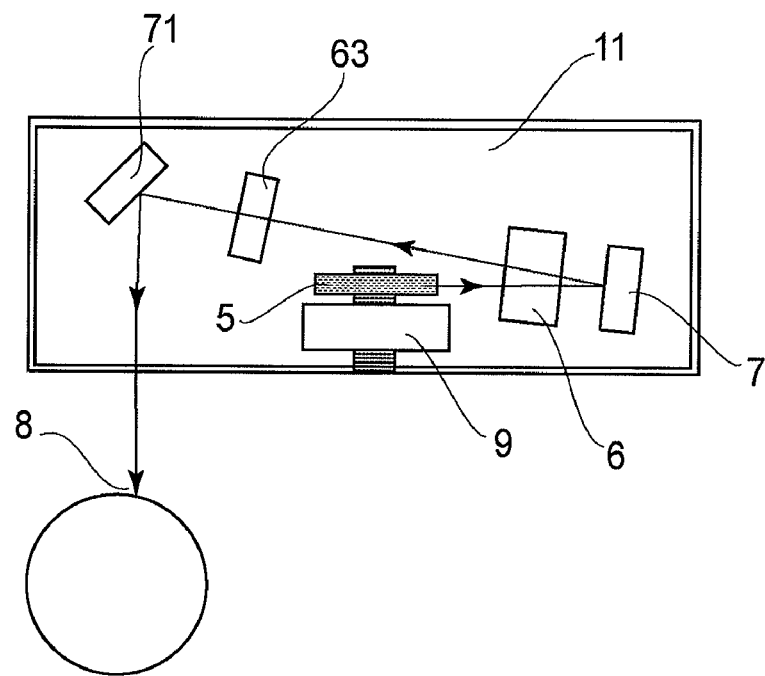
FIG. 7 is a sectional view along the sub-scan section, where a lens and a mirror are added.

Furthermore, one piece of long lens may be added after the imaging lens 6 through which the light beam passes twice. More specifically, as shown in FIG. 7, a Lens 63 may be disposed between the scanned surface 8 and the imaging lens 6 so that the magnification (sub-scan magnification) of the imaging optical system LB in the sub-scan direction can be lowered by centralizing the power in the sub-scan direction to the long lens 63.

This is advantageous in that the sensitivity such as pitch unevenness due to the surface tilt of the optical deflector, for example, can be lowered. Furthermore, use of a single piece of plane mirror 7 is not a requisition. Another plane mirror 71 may be added as shown in FIG. 7, in consideration of dispositional limitation of the image forming apparatus main assembly.

In the present embodiment, on the other hand, if the tilt angle in the sub-scan section which is defined between the reflection surface of the plane mirror 7, disposed at a position having a larger optical distance measured from the optical deflector 5 than that of the imaging lens 6, and the rotational axis of the optical deflector 5 is denoted by β (deg), the following condition is satisfied.

$$2°≤β≤10° \quad (5)$$

Conditional expression (5) is a condition which specifies the tilt angle β mentioned above. If the lower limit of conditional expression (5) is exceeded, the light beam reflected by the plane mirror 7 and the optical deflector may inconveniently interfere with each other.

Furthermore, if the upper limit of conditional expression (5) is exceeded, the oblique incidence angle of the light beam incident on the imaging lens 6 becomes too large, and it is difficult to reduce rotation of spot or scan line curve due to distortion of the wavefront aberration. This is undesirable.

In the present embodiment, the tilt angle β is β=4 deg. as mentioned above, and this satisfies conditional expression (5).

With this arrangement, no interference occurs between the light beam and the mechanical components as seen from FIG. 2 and, furthermore, a well-ordered spot having reduced wavefront aberration such as shown in FIG. 5 is accomplished.

Furthermore, in the present embodiment, if the angle which is defined within the main-scan section and between the principal ray of the light beam, emitted from the input optical system LA and incident on the deflecting surface 5a of the optical deflector 5, and the optical axis of the imaging optical system LB is denoted by γ (deg), the following condition is satisfied.

$$60°≤γ≤90° \quad (6)$$

Conditional expression (6) is a condition which specifies the angle γ mentioned above. If the lower limit of conditional expression (6) is exceeded, the incidence light beam to be incident on the optical deflector 5 may interfere with the imaging lens 6, and it is not preferable.

On the other hand, if the upper limit of conditional expression (6) is exceeded, it causes a possibility that the incidence light beam is eclipsed by the optical deflector 5, and it is not preferable.

In the present embodiment, the angle γ is γ=78 degrees as described above, and this satisfies conditional expression (6).

With this arrangement, there occurs no interference with the imaging lens 6 as seen from FIG. 1. Furthermore, use of four-surface polygonal mirror with a circumscribing radius of 10 mm having been used conventionally can be used conveniently.

Furthermore, in this embodiment, if the axial combined power in the main-scan section of the first transmission surface and the second transmission surface of the imaging lens 6 through which the light beam passes twice is denoted by øL, and the axial power in the main-scan section of the first transmission surface, constituting the lens light entrance surface 601 of the imaging lens 6 at the optical deflector 5 side is denoted by ø1, the following condition is satisfied.

$$-2.0<ø1/L<0.5 \quad (3)$$

Figure 8:
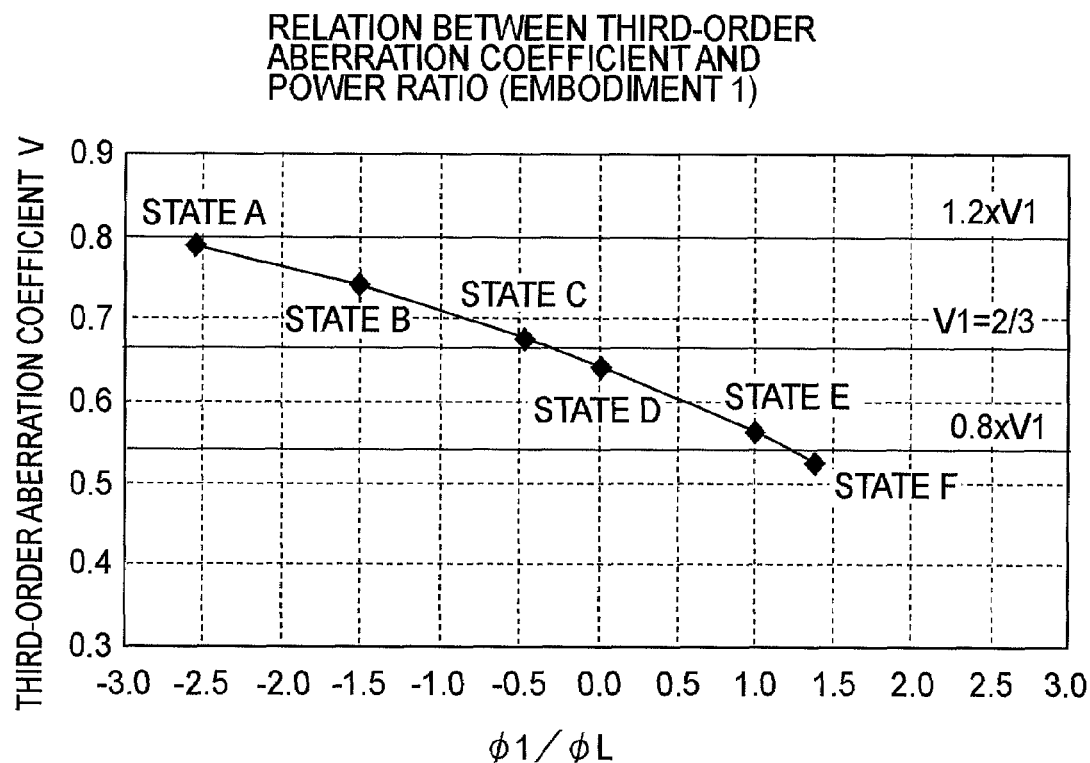
FIG. 8 is a graph illustrating the relationship between the power ratio and the third-order aberration coefficient V in the lens disposition of the first embodiment of the present invention.

FIG. 8 is a graph showing the results of calculation made with respect to the numerical example shown in the Table 1, wherein, while each lens surface position was fixed, the axial curvature radius was changed to cause a change of ø1/øL and the third-order aberration coefficient was calculated.

Figure 9:
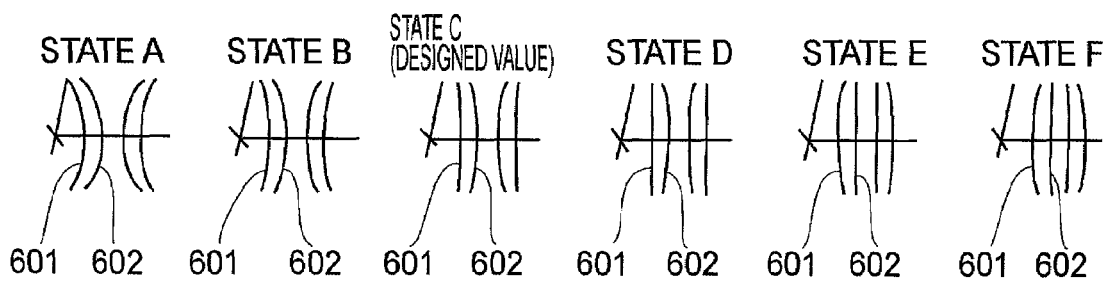
FIG. 9 is a diagram for explaining the lens shape according to the power ratio used in FIG. 8.

FIG. 9 is a main-scan sectional view based on axial curvature radius in different states, each diagram corresponding to a development view without a mirror.

In states A-C of FIG. 9, the lens surface 601 is concave and the lens surface 602 is convex. The state C corresponds to the state of design value. In state D, the lens surface 601 is plane and the lens surface 602 is convex.

In state E, the lens surface 601 is convex and the lens surface 602 is plane. In state F, the lens surface 601 is convex and the lens surface 602 is concave.

It is seen in FIG. 8 that, as the state changes from state A to state F, the value of third-order aberration coefficient decreases.

In the imaging optical system, it known that, as a theoretical value for securing the fθ characteristic, the third-order aberration coefficient V may be set to V=V1=⅔.

In state C (design value), it is seen that ø1/øL=−0.46 and V=0.679 which is very close to the theoretical value V1. Here, ø1/øL satisfies conditional expression (3).

With regard to the fθ characteristic, due to recent developments of electric correction techniques as described hereinbefore, deviation thereof to some extent does not cause any problem.

Since however, if an excessively large deviation is produced, the spot diameter in the main-scan direction changes, it is necessary to control the same to the level of 20% error to satisfy the following conditional expression (a), with respect to the theoretical value.

$$0.8V1<V<1.2V1 \quad (a)$$

The above conditional expression (3) has been derived in view of such situation.

As long as the lens shape is made to satisfy conditional expression (3), the value of the third-order aberration coefficient V can be kept within the range of ±20% with respect to the theoretical value.

The imaging optical element of the transmission type through which the light beam passes twice in the present embodiment, has a surface whose sign of curvature in the main-scan section is inverted within the effective diameter. Here, the shape of the inverting surface is concave facing to the optical deflector 5 side.

By changing the sign of curvature in the main-scan section, the fθ correction as well as the field curvature correction in the main-scan direction are facilitated, while assuring a thin thickness.

Furthermore, for better fθ correction and field curvature correction in the main-scan direction as well while assuring a thin thickness, the axial shape of the surface whose sign of curvature in the main-scan section is reversed within the effective diameter, may desirably have a concave shape facing the optical deflector 5 side.

If either one of the lens surface at the optical deflector 5 side or the lens surface at its opposite side has such shape, the effect of thinner thickness is provided. As a matter of course, both of these lens surfaces may have such shape.

Furthermore, in this embodiment as described above, the light beam from the collimator lens 3 is made into a slow convergence light beam, by which the optical path length is shortened.

In the present embodiment, the convergence m of the light beam which is incident on the optical deflector 5 is defined as follows.

$$m = 1 - Sk/f$$

where Sk is the distance (mm) in the main-scan section from the rear principal plane of the imaging optical system LB to the scanned surface 8, and f is the focal length (mm) of the imaging optical system LB in the main-scan section.

Figure 10:
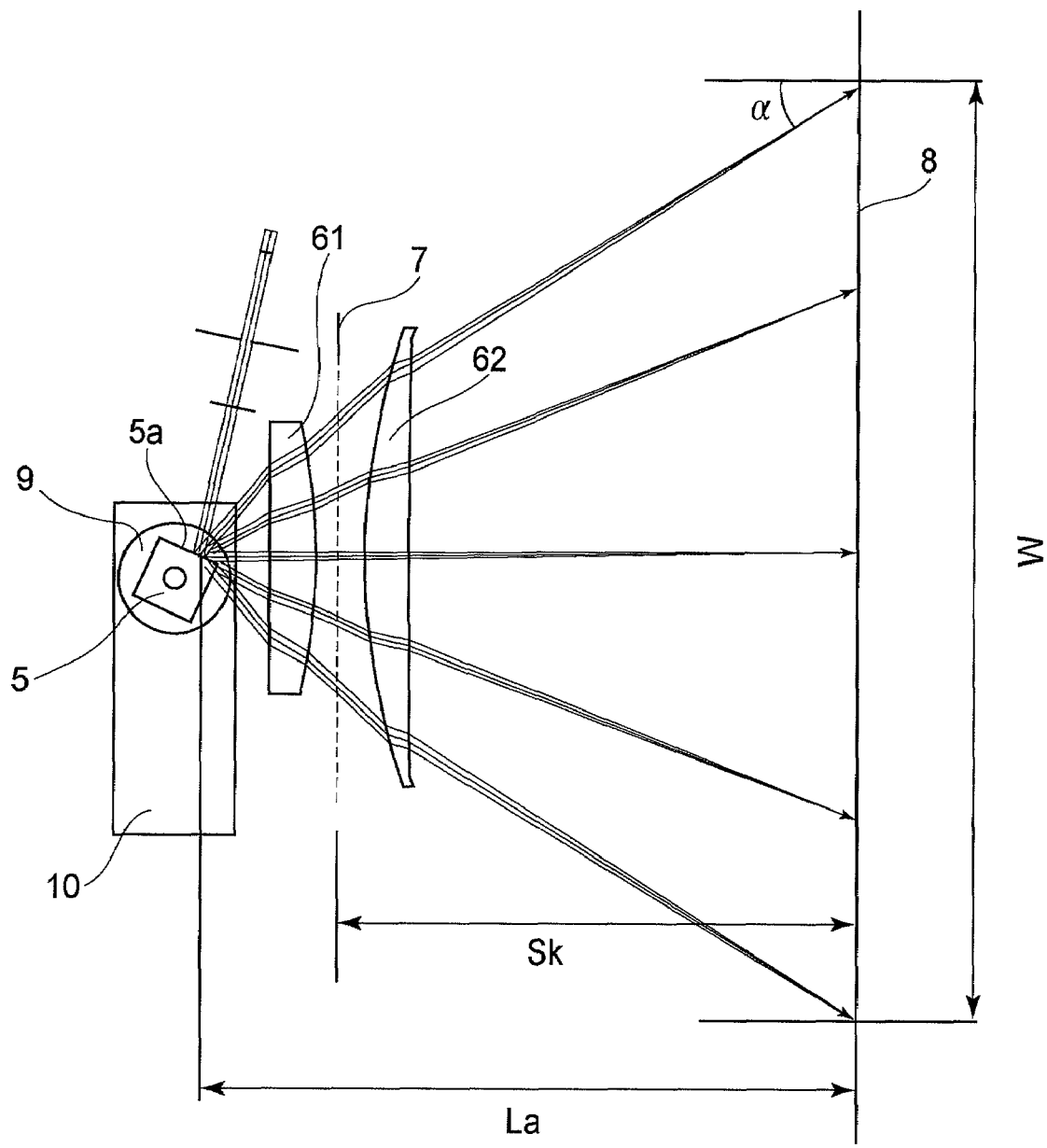
FIG. 10 is a development view in the main-scan direction of the optical scanning device according to the first embodiment of the present invention.

FIG. 10 illustrates a development view (main-scan sectional view), excluding the mirror in the imaging optical system. In FIG. 10, like numerals are assigned to components corresponding to those of FIG. 1.

If a parallel light beam is incident on the deflecting surface 5a, then Sk=f and thus the convergence is m=0. If 0<m, a convergent light beam is provided. If m<0, a divergent light beam is provided. If m=1, an optical scanning device of what is called a post-object type is provided.

Furthermore, if 1<m, the focal length f of the imaging optical system LB becomes negative, such that the focusing point of the incident light beam, assuming that there is no imaging optical system LB, will shift to the optical deflector 5 side from the scanned surface 8.

Although the optical path length can be shortened more by making the convergence m much stronger, if it is too strong, there occurs a problem of jitter in the main-scan direction due to the shift eccentric error of the deflecting surface 5a.

In the present embodiment, the convergence m is set to satisfy the following condition.

$$-0.1 < m < 0.5 \quad (4)$$

Conditional expression (4) is a condition which specifies the convergence m. If the lower limit of conditional expression (4) is exceeded, the optical path length becomes long and it is difficult to make the optical scanning device itself compact. This is undesirable.

If the upper limit of conditional expression (4) is exceeded, a large main-scan jitter will be undesirably produced due to the shift eccentric error of the deflecting surface.

The convergence m in the present embodiment is m=0.118, and this satisfies conditional expression (4).

More preferably, conditional expression (4) mentioned above had better be set as follows.

$$-0.05 < m < 0.3 \quad (4a)$$

Figure 11:
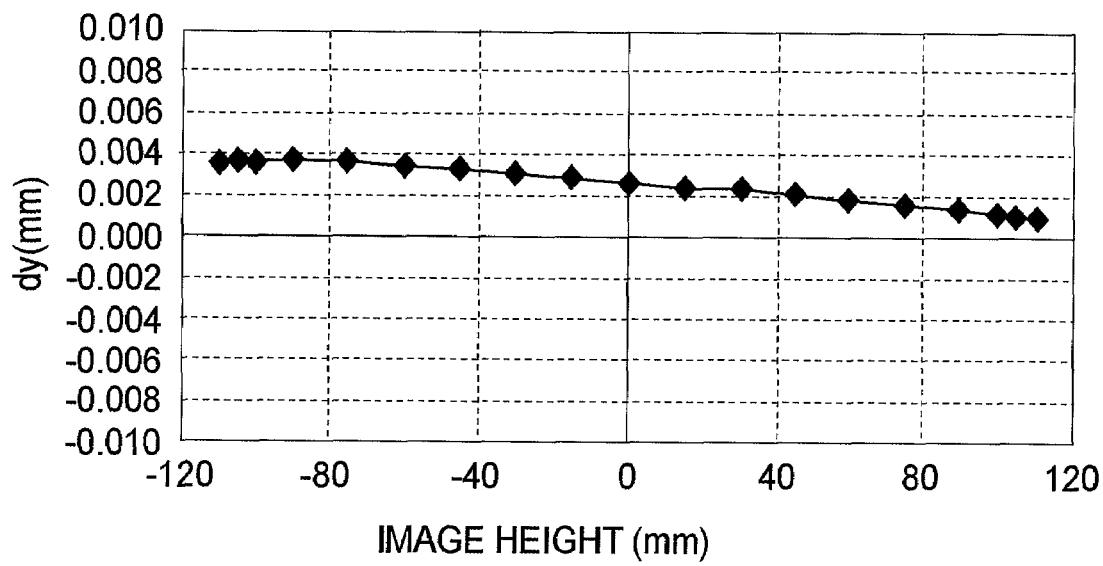
FIG. 11 is a graph depicting main-scan jitter of the first embodiment of the present invention.

FIG. 11 is a graph, illustrating jitter in the main-scan direction when a shift eccentric error of 10 μm was given to the deflecting surface.

As seen from FIG. 11, the jitter in the main-scan direction is of a magnitude 3.7 μm at the maximum, and it has been controlled to a satisfactory level causing no problem.

Although the present embodiment has been described with reference to an example wherein a polygon mirror (optical deflector) having plural deflecting surfaces is used, various developments are being recently attempted for optical deflectors of resonance type wherein a single deflecting surface is oscillated.

By using this resonance type optical deflector, problems such as pitch unevenness due to previously described surface tilt or main-scan jitter due to plane decentering, can be avoided.

Thus, when the present embodiment is used in combination with a resonance type optical deflector, the advantageous effects thereof will be more notable.

If only one imaging optical element of transmission type is used to constitute the imaging optical system LB, the structure is very simple. On the other hand, two ore more imaging optical elements (including transmission type and reflection type) may be used to constitute the imaging optical system LB.

Furthermore, two ore more imaging optical elements 2 of transmission type may be used, through each of which the light beam passes twice. This makes the aberration correction easier.

Embodiment 2

Figure 12:
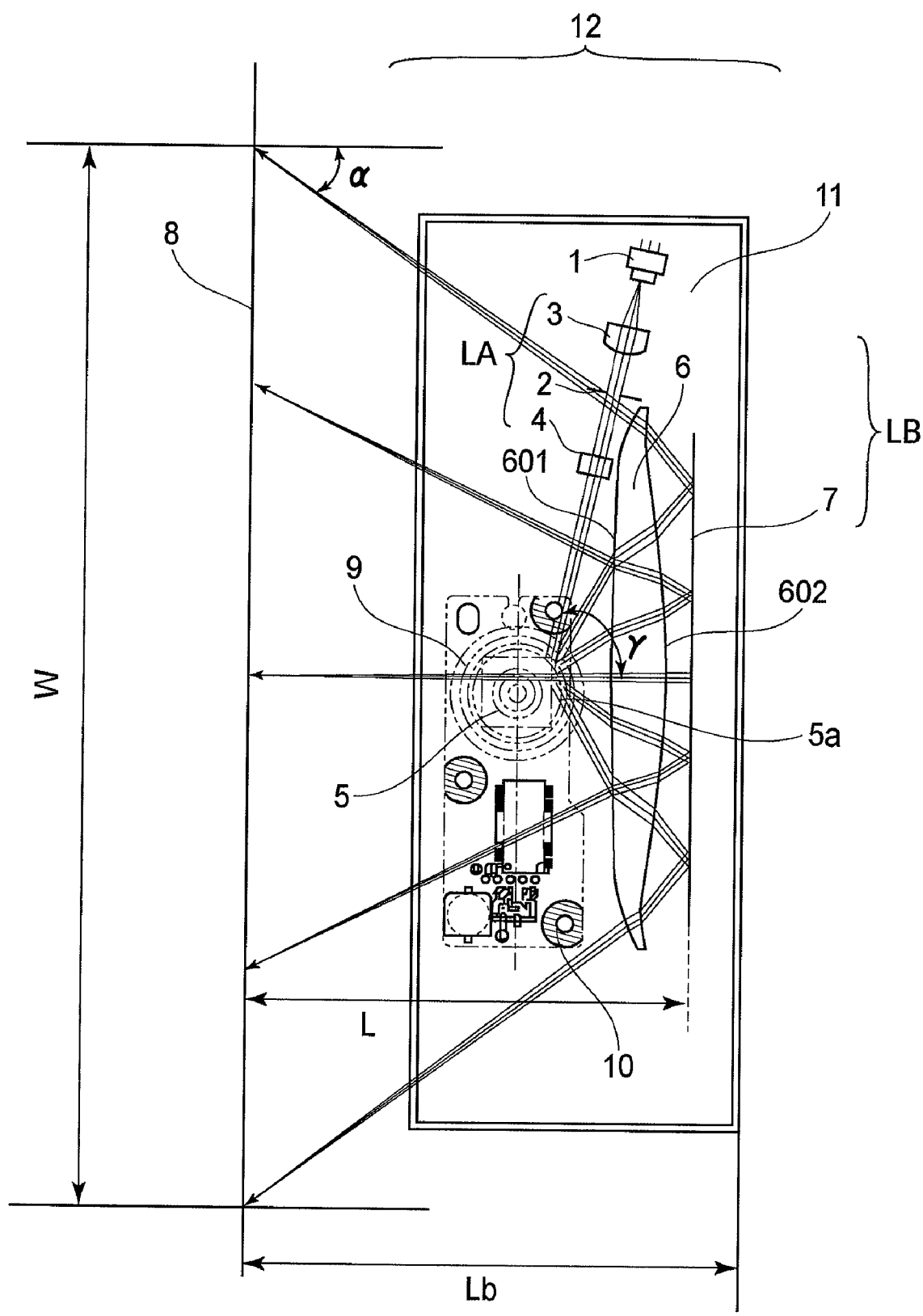
FIG. 12 is a sectional view, along the main-scan section, of an optical scanning device according to a second embodiment of the present invention.

FIG. 12 is a sectional view in the main-scan direction (main-scan sectional view) of a main portion of a second embodiment of the present invention.

Figure 13:
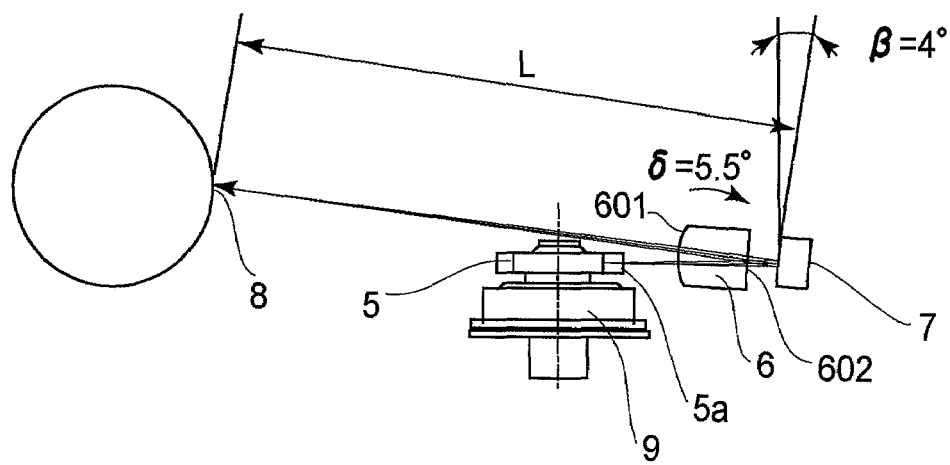
FIG. 13 is a sectional view, along the sub-scan section, of the optical scanning device according to the second embodiment of the present invention.

FIG. 13 is a sectional view in the sub-scan direction (sub-scan sectional view) of a main portion of the second embodiment of the present invention.

In FIG. 12 and FIG. 13, like numerals are assigned to components corresponding to those of FIG. 1 and FIG. 2.

This embodiment differs from the first embodiment in that the scan field angle is widened for further compactification.

Other structures and optical functions are similar to those of the first embodiment, and similar advantageous effects are obtained.

Also in the present embodiment, like the first embodiment described hereinbefore, the light beam incidence is so set that that the angle y which is defined within the main-scan section and between the optical axis of the imaging lens 6 and the principal ray of the light beam incident on the deflecting surface 5a is γ=78 deg.

Furthermore, as seen from FIG. 13, the plane mirror 7 is inclined by β=4 deg. in the sub-scan direction relative to the rotational axis of the optical deflector 5.

Next, the lens form and optical configuration according to the present embodiment are shown in Table 2.

TABLE 2

TABLE 2: DESIGN DATA

| Wavelength & Refractive Index | | |
|---|---|---|
| Used Wavelength | λ (nm) | 790 |
| Lens Refractive Index | n | 1.52781 |
| Disposition | | |
| Main-Scan Laser Incidence Angle (deg) | γ | 78 |
| Sub-Scan Laser Incidence Angle (deg) | | 0 |

TABLE 2-continued

| | | | |
|---|---|---|---|
| Light Ray Max. Emission Angle (deg) | | | +/−63.0 |
| Polygon Rotational Center Coordinates (mm) | Y-direction | | −6.281 |
| | X-direction | | −3.480 |
| No. of Polygon Surfaces | | | 4 |
| Polygon Circumscribing Diameter (mm) | | | φ 20 |
| Effective Scan Width | W | | 220 |
| fθ Coefficient | k (rad/mm) | | 100 |

Lens Disposition

| | X-direction | Y-direction | Z-direction |
|---|---|---|---|
| Lens Entrance Surface 601 | 12.900 | 0.200 | 1.350 |
| Lens Exit Surface 602 | 23.849 | 0.200 | 0.296 |
| Mirror Surface 7 | 28.600 | 0.200 | 0.000 |
| Lens Re-entrance Surface 60 | 23.849 | 0.200 | 0.296 |
| Lens Re-exit surface 601 | 12.900 | 0.200 | 1.350 |
| Scanned Surface 8 | −60.323 | 0.200 | 13.085 |

| Aspherical Surface Data (Main-Scan Direction) | | Aspherical Surface Data (Sub-Scan Direction) | |
|---|---|---|---|
| Entrance Surface 601 | Exit Surface 602 | Entrance Surface 601 | Exit Surface 602 |

| | Entrance Surface 601 | Exit Surface 602 | | Entrance Surface 601 | Exit Surface 602 |
|---|---|---|---|---|---|
| R | −5.62595E+02 | −1.21939E+02 | r0 | 2.28515E+01 | −4.81612E+01 |
| K | 6.66092E+01 | −2.96142E+01 | D2s | 4.17815E−04 | 1.11894E−03 |
| B4s | 1.77157E−06 | 4.85368E−07 | D4s | −3.45722E−07 | 2.14167E−06 |
| B6s | −9.85072E−10 | −6.26850E−10 | D6s | 2.41949E−10 | −2.01080E−09 |
| B8s | 2.84035E−13 | 2.91649E−13 | D8s | −1.02294E−13 | 1.30162E−12 |
| B10s | −1.65434E−17 | −3.46288E−17 | D10s | 1.78377E−17 | 0.00000E+00 |
| B4e | 1.84666E−06 | 5.49617E−07 | D2e | 7.61077E−04 | 1.13347E−03 |
| B6e | −9.13237E−10 | −5.56051E−10 | D4e | −5.05327E−07 | 5.22825E−08 |
| B8e | 2.49263E−13 | 2.47692E−13 | D6e | 2.38376E−10 | 6.25214E−10 |
| B10e | −1.23109E−17 | −2.80073E−17 | D8e | −8.06165E−14 | −2.84739E−14 |
| | | | D10e | 1.38385E−17 | 0.00000E+00 |

(Subscript "s" means the surface is at the laser side.)
(Subscript "e" means the surface is at the side remote from the laser.)

Meridional Function

| | Entrance Surface 601 | Exit Surface 602 |
|---|---|---|
| A0–A9 | 0 | 0 |
| A10 | 3.66473E−17 | 0 |
| A11 | −2.27229E−19 | 0 |
| A12 | −3.11240E−20 | 0 |
| A13 | 1.33147E−22 | 0 |
| A14 | 9.08013E−24 | 0 |
| A15 | −2.20271E−26 | 0 |
| A16 | −8.74298E−28 | 0 |

The aspherical-surface expression used here is similar to that of the first embodiment described above.

In this embodiment, as shown in Table 2, the shape of each of the lens entrance surface 601 of the imaging lens 6 at the optical deflector 5 side and of the lens exit surface 602 thereof at the plane mirror 7 side, with respect to the main-scan direction, is defined in accordance with a single function mentioned above.

With this arrangement, similar advantageous results as of the first embodiment described hereinbefore are obtained.

In this embodiment, like the first embodiment described hereinbefore, an infrared light source which emits a light beam at an emission wavelength λ=790 nm is used as the light source means 1.

Furthermore, the proportionality coefficient κ (Y=κθ) for the image height Y with the deflective reflection angle θ is κ=100 (rad/mm).

Figure 14:
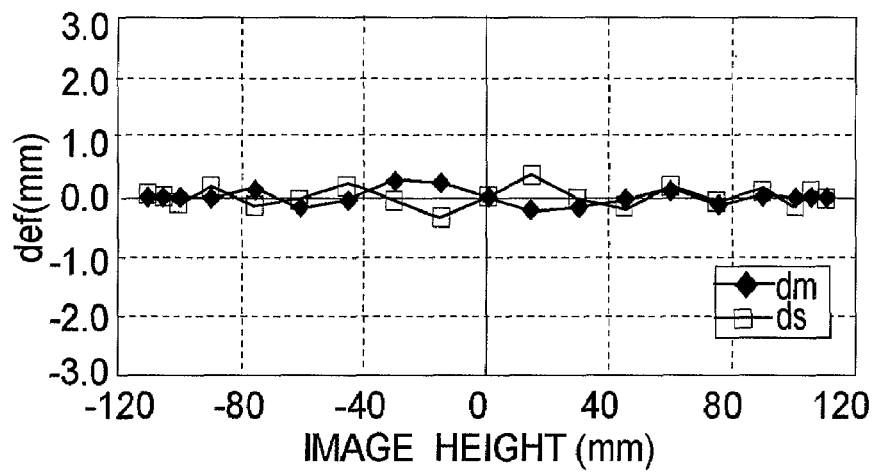
FIG. 14 is a graph depicting a field curvature of the second embodiment of the present invention.

FIG. 14 is a graph depicting the field curvature in the main-scan direction and the sub-scan direction in the second embodiment of the present invention.

Within the effective width (W=220 mm) of the image, the field curvature in the main-scan direction is 0.50 mm, and the field curvature in the sub-scan direction is 0.76 mm. Hence, it is seen that these curvatures have been well reduced.

Figure 15:
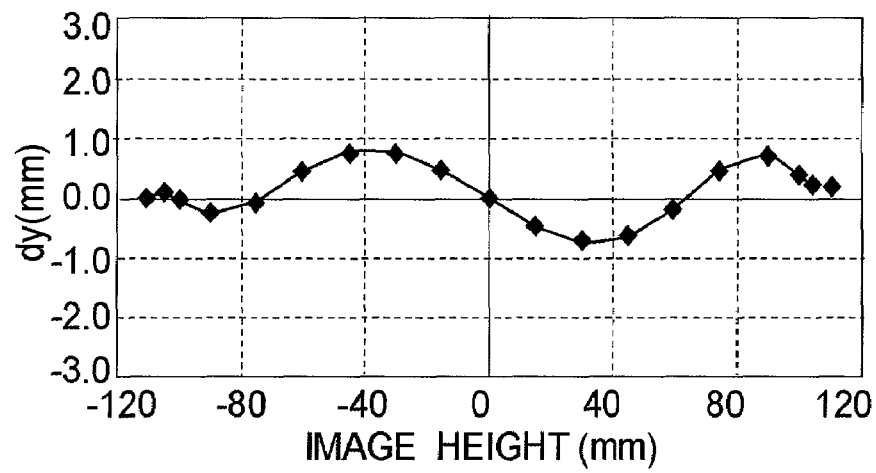
FIG. 15 is a graph depicting an fθ characteristic of the second embodiment of the present invention.

FIG. 15 is a graph depicting the fθ characteristic of the second embodiment of the present invention. FIG. 15 shows the difference obtained by subtracting an ideal image height from the position where the light beam actually impinges.

It is seen that there is a deviation which is 0.761 mm at the maximum. Although this value is slightly too large to use, the fθ characteristic itself can be reduced by changing the image clock in accordance with each image height.

However, if the deviation of the fθ characteristic is too large, then the spot diameter itself in the main-scan direction will change.

In this embodiment, the fθ characteristic is at a satisfactory level with respect to the spot diameter which is influential to the depth of the latent image.

Figure 16:
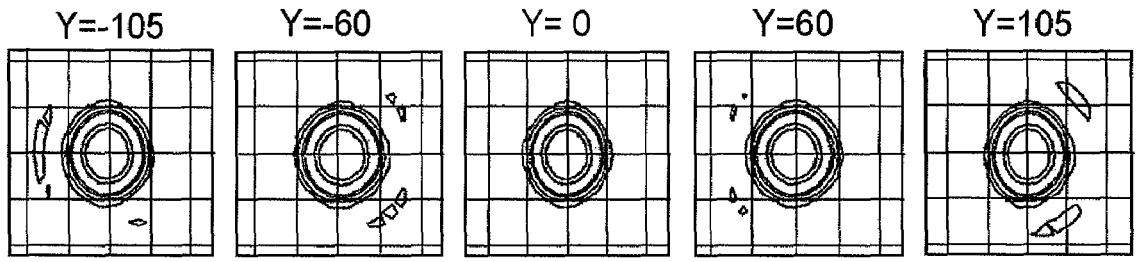
FIG. 16 is a diagram for explaining a spot profile of the second embodiment of the present invention.

FIG. 16 is a schematic diagram which illustrates the cross-sectional shapes of spots at different image heights. More specifically, FIG. 16 illustrates the sections sliced at 2%, 5%, 10%, 13.5%, 36.8% and 50% of the spot peak light quantity, at each image height.

Generally, in optical scanning devices in which a light beam is incident from an oblique direction within the sub-scan section, there occurs a phenomenon that the spot rotates due to distortion of the wavefront aberration.

In the present embodiment, such distortion of the wavefront aberration is reduced by optimizing the power disposition of the lens surfaces, tilt amount and shift amount of the lens, as well as the amount of curve of the meridional in the sub-scan direction.

With regard to the tilt amount of the imaging lens 6, when the point of intersection between the deflecting surface 5a and the principal ray of the incident light beam is taken as an origin, the lens is tilted by δ=5.5 degrees in the sub-scan direction around a coordinate (12.900, 0.200, 1.350), as shown by an arrow in FIG. 13.

Figure 17:
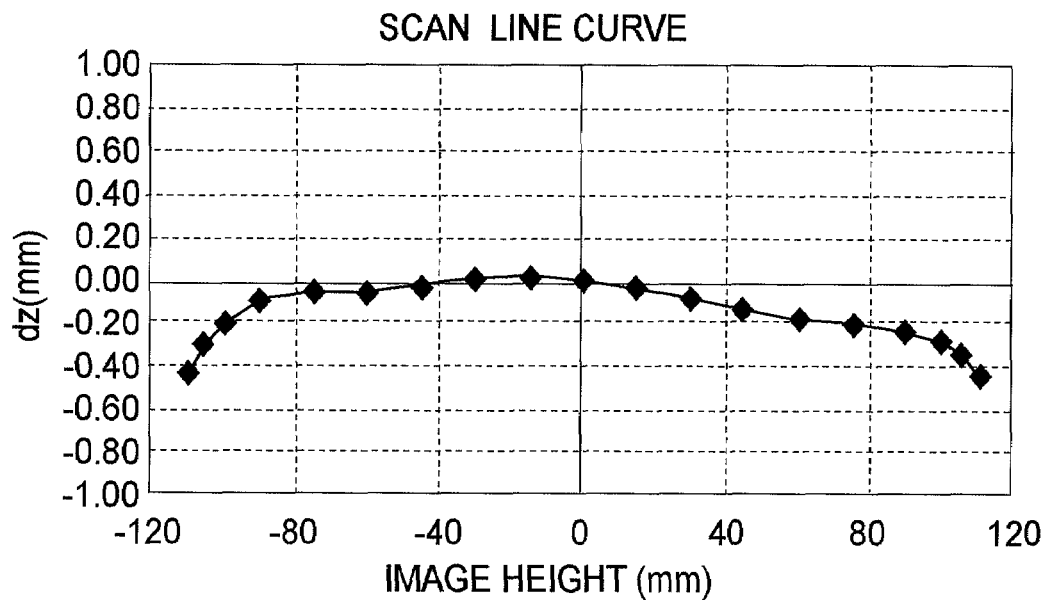
FIG. 17 is a graph depicting scan line bend of the second embodiment of the present invention.

FIG. 17 is a graph depicting the scan line curve which arrives at the scan surface, in the second embodiment of the present invention.

Generally, in monochromatic image forming apparatuses, the scan line curve should be controlled to less than 0.2 mm.

In the present embodiment, the scan line curve is 0.449 mm which cannot be used directly.

Recently, however, even with regard to the positional deviation in the sub-scan direction (scan line tilt or scan line bend), it can be corrected by shifting the image data in the sub-scan direction, for every image height.

Furthermore, the scan line bend can be corrected even by bending optical components such as a reflecting mirror.

In this embodiment as described hereinbefore, the light beam passed through the imaging lens 6 is turned back by the plane mirror 7 so that it again passes through the imaging lens 6. With this arrangement, the optical scanning device as a whole can be made compact.

In this embodiment, the distance Lb from the end portion of the optics box 11 shown in FIG. 12 to the scanned surface 8 is Lb=88.9 mm. Thus, an optical scanning device which is more compact than that of the first embodiment is realized.

The plane mirror 7 of the present embodiment comprises a flat surface mirror which has no power both in the main-scan direction and the sub-scan direction as described above. Hence, there is a relation $|\emptyset M/\emptyset|=0$ and this satisfies conditional expression (1).

Furthermore, in the present embodiment, the angle α which is defined within the main-scan section and between the principal ray of the light beam incident on the image end portion and a plane perpendicular to the scanned surface 8 is α=35.5 deg. Also, the effective width W of the image is W=220 mm, and the distance L from the plane mirror 7 to the scanned surface 8 along the axial light beam is L=89.9 mm. Therefore, there is a relation $\alpha \cdot W/L = 86.9$ and this satisfies conditional expression (2).

In the present embodiment, the tilt angle β in the sub-scan section is β=4 deg. as mentioned above, and this satisfies conditional expression (5).

With this arrangement, no interference occurs between the light beam and the mechanical components as seen from FIG. 13 and, furthermore, a well-ordered spot having reduced wavefront aberration such as shown in FIG. 16 is accomplished.

Furthermore, in the present embodiment as described above, the angle γ which is defined between the principal ray of the light beam from the input optical system LA and the optical axis of the imaging optical system LB is γ=78 deg. This satisfies conditional expression (6).

With this arrangement, there occurs no interference with the imaging lens 6 as seen from FIG. 12. Furthermore, use of four-surface polygonal mirror with a circumscribing radius of 10 mm having been used conventionally can be used conveniently.

Furthermore, in this embodiment, the components are so set as to satisfy conditional expression (3), as in the above-mentioned first embodiment.

Figure 18:
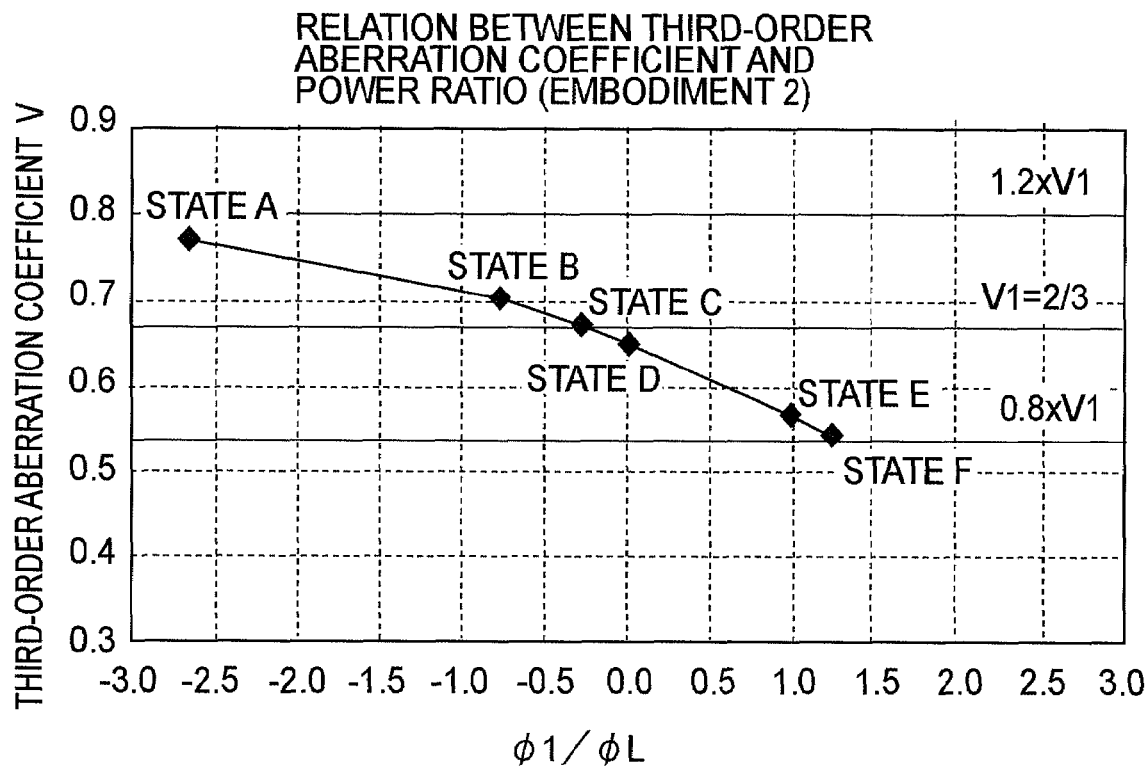
FIG. 18 is a graph illustrating the relationship between the power ratio and the third-order aberration coefficient V in the lens disposition of the second embodiment of the present invention.

FIG. 18 is a graph showing the results of calculation made with respect to the numerical example shown in the Table 2, wherein, while each lens surface position was fixed, the axial curvature radius was changed to cause a change of ø1/øL and the third-order aberration coefficient was calculated.

Figure 19:
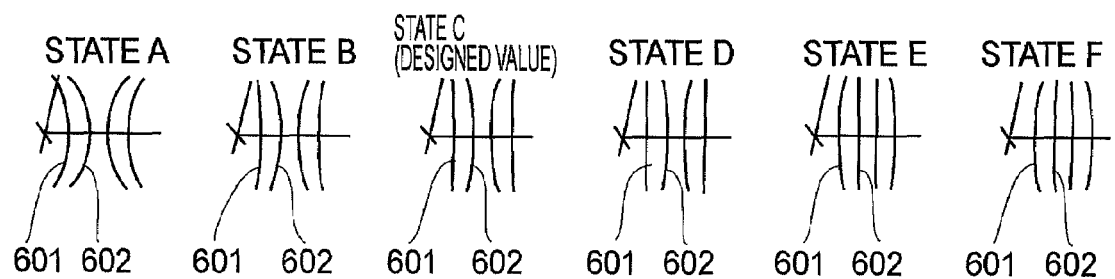
FIG. 19 is a diagram for explaining the lens shape according to the power ratio used in FIG. 18.

FIG. 19 is a main-scan sectional view based on axial curvature radius in different states, each diagram corresponding to a development view without a mirror.

In states A-C of FIG. 19, the lens surface 601 is concave and the lens surface 602 is convex. The state C corresponds to the state of design value.

In state D, the lens surface 601 is plane and the lens surface 602 is convex.

In state E, the lens surface 601 is convex and the lens surface 602 is plane.

In state F, the lens surface 601 is convex and the lens surface 602 is concave.

It is seen in FIG. 18 that, as the state changes from state A to state F, the value of third-order aberration coefficient decreases.

In the imaging optical system, it known that, as a theoretical value for securing the fθ characteristic, the third-order aberration coefficient V may be set to V=V1=⅔.

In state C (design value), it is seen that ø1/øL=−0.27 and V=0.67 which is very close to the theoretical value V1. Here, ø1/øL satisfies conditional expression (3).

Furthermore, in this embodiment like the first embodiment described hereinbefore, the light beam from the collimator lens 3 is made into a slow convergence light beam, by which the optical path length is shortened.

The convergence m in the present embodiment is m=0.248, and this satisfies conditional expression (4).

Figure 20:
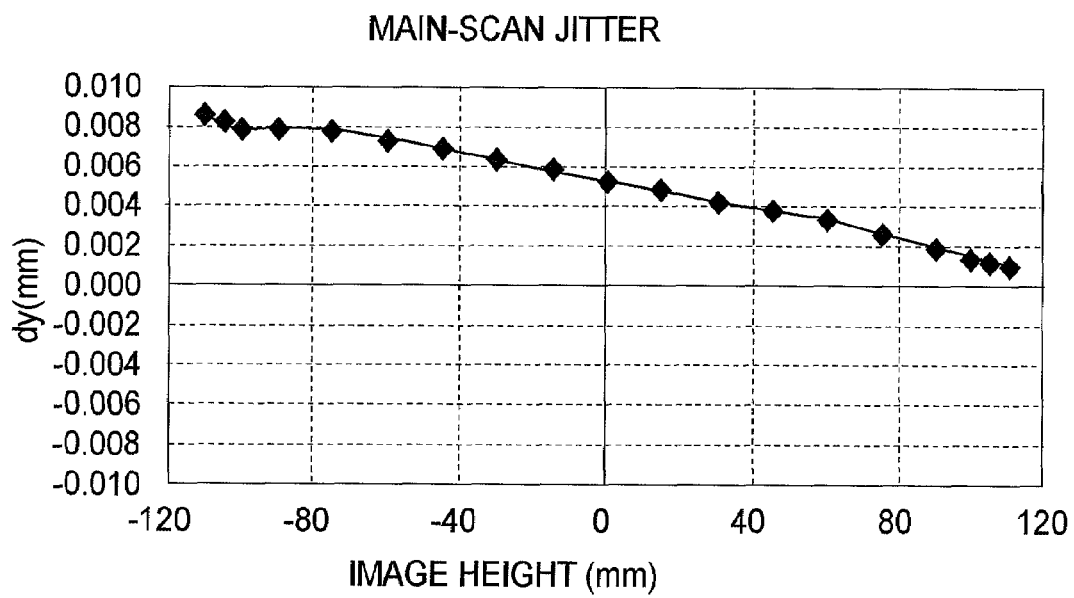
FIG. 20 is a graph depicting main-scan jitter of the second embodiment of the present invention.

FIG. 20 is a graph, illustrating jitter in the main-scan direction when a shift eccentric error of 10 μm was given to the deflecting surface.

As seen from FIG. 20, the jitter in the main-scan direction is of a magnitude 8.7 μm at the maximum, and it has been controlled to a satisfactory level causing no problem.

Figure 21:
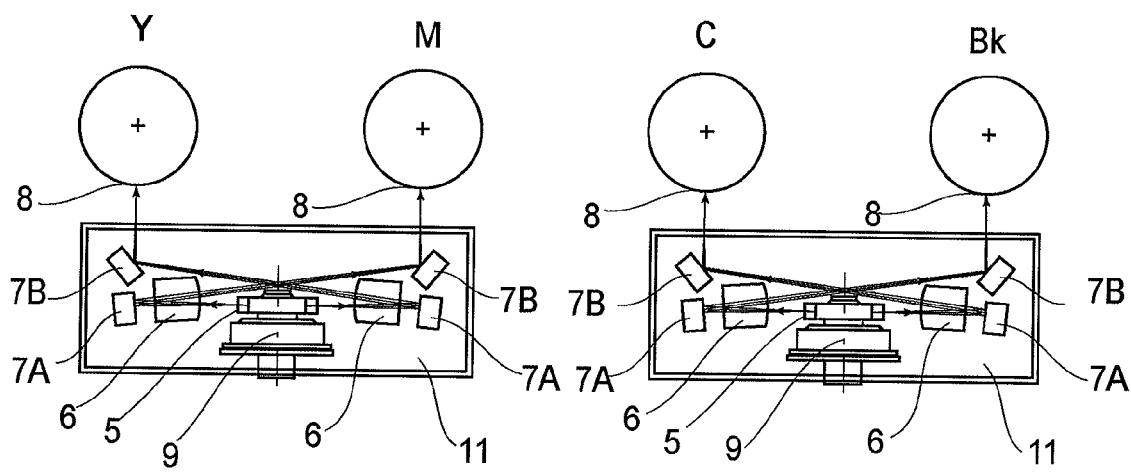
FIG. 21 is a sectional view of a main portion of a color image forming apparatus which uses an imaging optical system according to the second embodiment of the present invention.

FIG. 21 is a sub-scan sectional view wherein optical scanning devices according to the second embodiment of the present invention are disposed on the opposite sides of an optical deflector (polygonal mirror) 5, in an application to a color image forming apparatus.

In FIG. 21, the deflection light beam having been deflectively reflected by the optical deflector 5 passes through the imaging lens 6 and, thereafter, it is turned back by the plane mirror 7A so that it again passes through the imaging lens 6 in a reversed direction.

The light beam passed through the imaging lens 6 is turned back upwardly by the plane mirror 7B, and it is directed to photosensitive drum 8 (Y, M, C, Bk) which is the surface to be scanned.

With this structure, the distance from the photosensitive drum 8 to the optical scanning device (optics box 11) can be shortened, and further compactification is accomplished.

Embodiment 3

Figure 22:
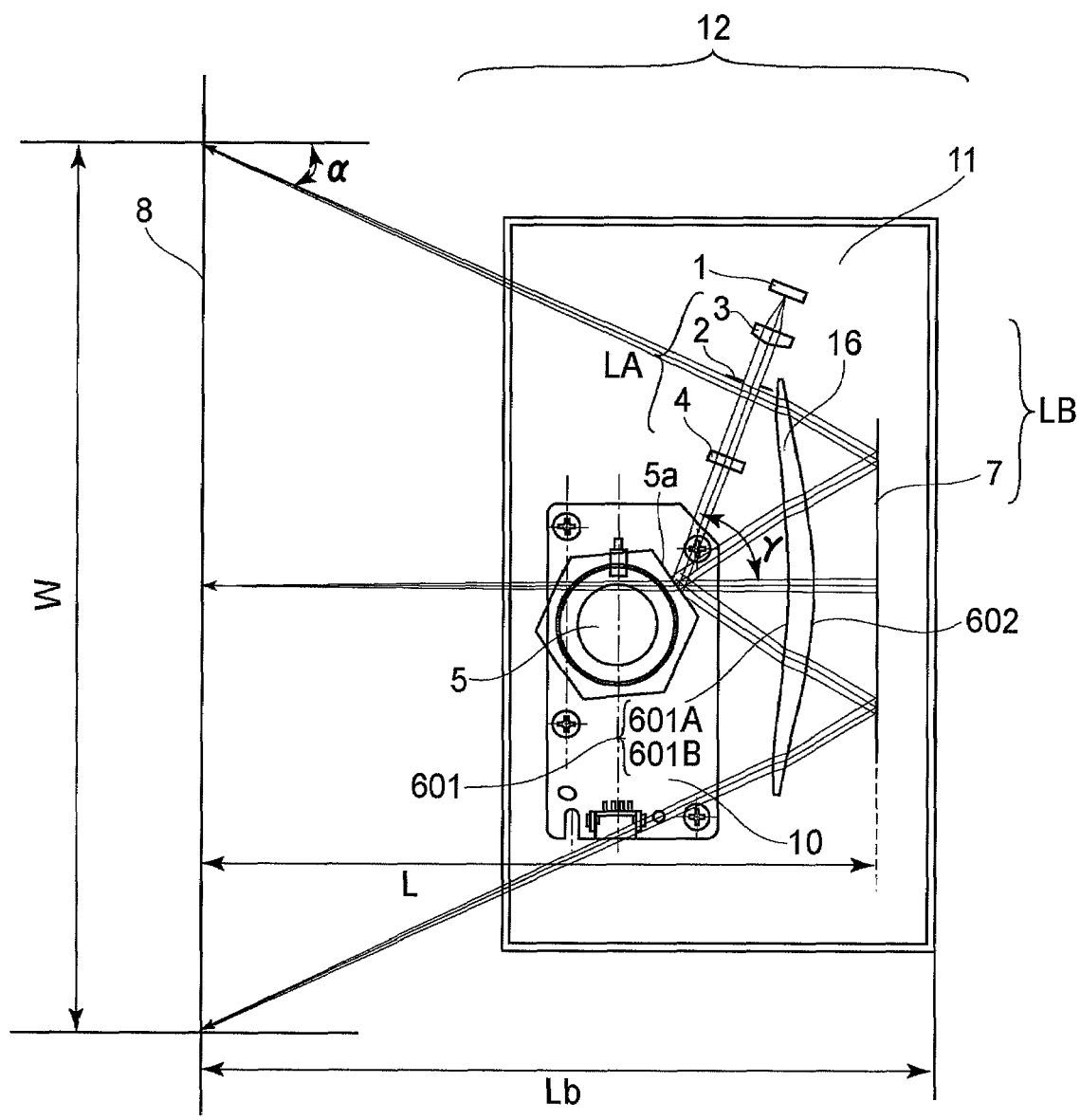
FIG. 22 is a sectional view, along the main-scan section, of an optical scanning device according to a third embodiment of the present invention.

FIG. 22 is a sectional view in the main-scan direction (main-scan sectional view) of a main portion of a third embodiment of the present invention.

Figure 23:
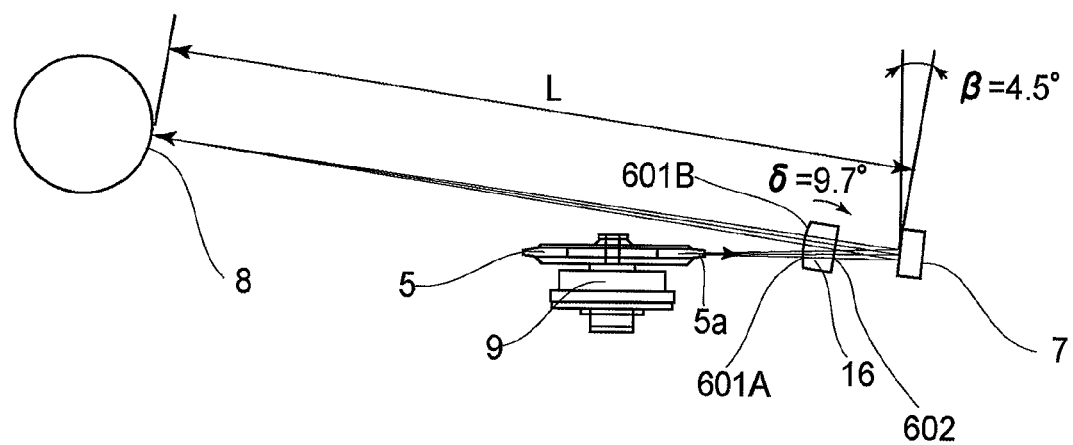
FIG. 23 is a sectional view, along the sub-scan section, of the optical scanning device according to the third embodiment of the present invention.

FIG. 23 is a sectional view in the sub-scan direction (sub-scan sectional view) of a main portion of the third embodiment of the present invention.

In FIG. 22 and FIG. 23, like numerals are assigned to components corresponding to those of FIG. 1 and FIG. 2.

This embodiment differs from the first embodiment in that the surface of the imaging lens at the optical deflector side is formed with such shape that the refracting power in the sub-scan section is different between the position where the light beam deflected by the deflecting surface passes through and the position where the light beam turned back by the plane mirror passes through.

Other structures and optical functions are similar to those of the first embodiment and, based on this, similar advantageous effects are obtainable.

More specifically, denoted in the diagram at 16 is an imaging lens whose lens surface 601 is divided into a lens entrance surface 601A (first transmission surface) and a lens re-exit surface 601B (fourth transmission surface). The shapes of them in the sub-scan section are defined by multi-stage toric surfaces which are different from each other.

In the present embodiment, the light beam incidence is so set that that the angle γ which is defined within the main-scan section and between the optical axis of the imaging lens 6 and the principal ray of the light beam incident on the deflecting surface 5a is γ=70 deg.

Furthermore, in this embodiment as seen from FIG. 23, the plane mirror 7 is inclined by β=4.5 deg. in the sub-scan direction relative to the rotational axis of the optical deflector 5.

Next, the lens form and optical configuration according to the present embodiment are shown in Table 3 and Table 4.

TABLE 3

DESIGN DATA

| Wavelength & Refractive Index | | | |
|---|---|---|---|
| Used Wavelength | λ (nm) | | 790 |
| Lens Refractive Index | n | | ±11.52781 |
| Disposition | | | |
| Main-Scan Laser Incidence Angle (deg) | γ | | 70 |
| Sub-Scan Laser Incidence Angle (deg) | | | 0 |
| Light Ray Max. Emission Angle (deg) | | | +/−35.0 |
| Polygon Rotational Center Coordinates (mm) | Y-direction | | −14.495 |
| | X-direction | | −9.497 |
| No. of Polygon Surfaces | | | 6 |
| Polygon Circumscribing Diameter (mm) | | | φ40 |
| Effective Scan Width | W | | 220 |
| fθ Coefficient | k (rad/mm) | | 180 |

| Lens Disposition | | | |
|---|---|---|---|
| | X-direction | Y-direction | Z-direction |
| Lens Entrance Surface 601A | 27.150 | 0.300 | 0.000 |
| Lens Exit Surface 602 | 33.064 | 0.300 | −1.011 |
| Mirror Surface 7 | 47.650 | 0.300 | 0.000 |
| Lens Re-entrance Surface 60 | 33.064 | 0.300 | −1.011 |
| Lens Re-exit surface 601B | 27.150 | 0.300 | 2.850 |
| Scanned Surface 8 | −115.593 | 0.300 | 25.323 |

TABLE 4

TABLE 4: DESIGN DATA

| | Aspherical Surface Data (Main-Scan Direction) | | | | Aspherical Surface Data (Sub-Scan Direction) | | |
|---|---|---|---|---|---|---|---|
| | Entrance Surface 601A | Re-exit Surface 601B | Exit Surface 602 | | Entrance Surface 601A | Re-exit Surface 601B | Exit Surface 602 |
| R | −1.65408E+02 | −1.65408E+02 | −1.01848E+02 | r0 | 9.18069E+01 | 2.4880E+01 | 0.00000E+00 |
| K | 3.05478E+00 | 3.05478E+00 | −4.04760E+00 | D2s | −2.41507E−03 | 2.86566E−04 | 0.00000E+00 |
| B4s | 8.32801E−07 | 8.32801E−07 | 4.64448E−07 | D4s | 3.17696E−06 | −5.75144E−08 | 0.00000E+00 |
| B6s | −4.82510E−11 | −4.82510E−11 | −7.25597E−11 | D6s | 0.00000E+00 | 8.04241E−12 | 0.00000E+00 |
| B8s | 1.15003E−14 | 1.15003E−14 | 2.45752E−14 | D8s | 0.00000E+00 | −2.09300E−15 | 0.00000E+00 |
| B10s | 3.20857E−18 | 3.20857E−18 | −3.01668E−19 | D10s | 0.00000E+00 | −2.70640E−19 | 0.00000E+00 |
| B4e | 8.76851E−07 | 8.76851E−07 | 4.78763E−07 | D2e | −3.21295E−03 | 3.00345E−04 | 0.00000E+00 |
| B6e | −5.82652E−11 | −5.82652E−11 | −4.40433E−11 | D4e | 6.20953E−06 | −4.63063E−08 | 0.00000E+00 |
| B8e | 2.26416E−14 | 2.26416E−14 | 1.71773E−14 | D6e | 0.00000E+00 | 5.77076E−12 | 0.00000E+00 |
| B10e | −1.08586E−18 | −1.08586E−18 | −1.56611E−18 | D8e | 0.00000E+00 | −1.27448E−14 | 0.00000E+00 |
| | | | | D10e | 0.00000E+00 | 3.17089E−18 | 0.00000E+00 |

(Subscript "s" means the surface is at the laser side.)
(Subscript "e" means the surface is at the side remote from the laser.)

Meridional Function

| | Entrance Surface 601A | Re-exit Surface 601B | Exit Surface 602 |
|---|---|---|---|
| A0-A16 | 0 | 0 | 0 |

The aspherical-surface expression used here is similar to that of the first embodiment described above.

In this embodiment, as shown in Table 3 and Table 4, the lens entrance surface 601A and the lens re-exit surface 601B of the imaging lens 16 which are at the optical deflector 5 side are defined by shapes having different refracting powers in the sub-scan section.

However, both of the light entrance surface 601A and lens re-exit surface 601B have the same shape (same refracting power) in the main-scan section. Hence, there is no large surface level difference at the lens surface.

The shape of the lens exit surface 602 of the imaging lens 16 at the plane mirror 7 side with respect to the main-scan direction is defined in accordance with a single function mentioned above, like the first and second embodiments.

In this embodiment, like the first embodiment described hereinbefore, an infrared light source which emits a light beam at an emission wavelength λ=790 nm is used as the light source means 1.

Furthermore, the proportionality coefficient κ (Y=κθ) for the image height Y with the deflective reflection angle θ is κ=180 (rad/mm).

Figure 24:
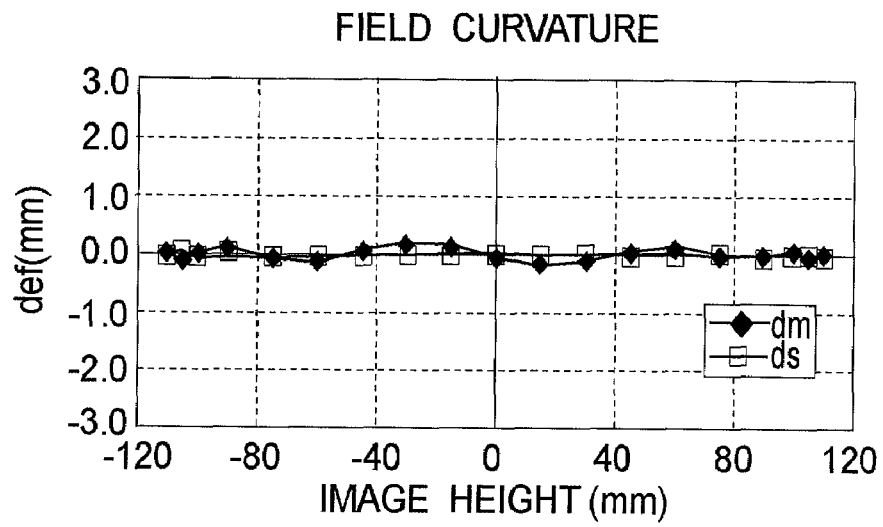
FIG. 24 is a graph depicting a field curvature of the third embodiment of the present invention.

FIG. 24 is a graph depicting the field curvature in the main-scan direction and the sub-scan direction in the third embodiment of the present invention.

Within the effective width (W=220 mm) of the image, the field curvature in the main-scan direction is 0.29 mm, and the field curvature in the sub-scan direction is 0.07 mm. Hence, it is seen that these curvatures have been well reduced.

Figure 25:
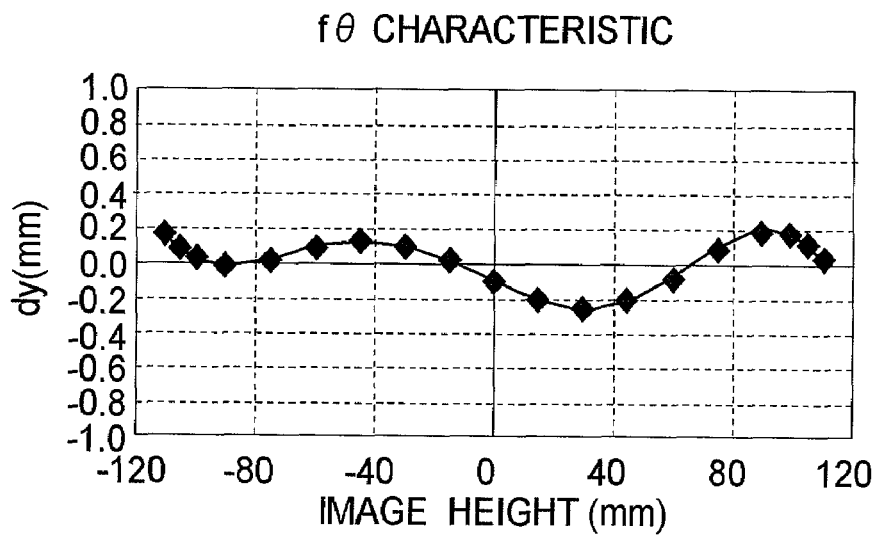
FIG. 25 is a graph depicting an fθ characteristic of the third embodiment of the present invention.

FIG. 25 is a graph depicting the fθ characteristic of the third embodiment of the present invention. FIG. 25 shows the difference obtained by subtracting an ideal image height from the position where the light beam actually impinges. It is seen that there is a deviation which is 0.248 mm at the maximum.

Although this value is slightly too large to use, the fθ characteristic itself can be reduced by changing the image clock in accordance with each image height.

However, if the deviation of the fθ characteristic is too large, then the spot diameter itself in the main-scan direction will change.

In this embodiment, the fθ characteristic is at a satisfactory level with respect to the spot diameter which is influential to the depth of the latent image.

Figure 26:
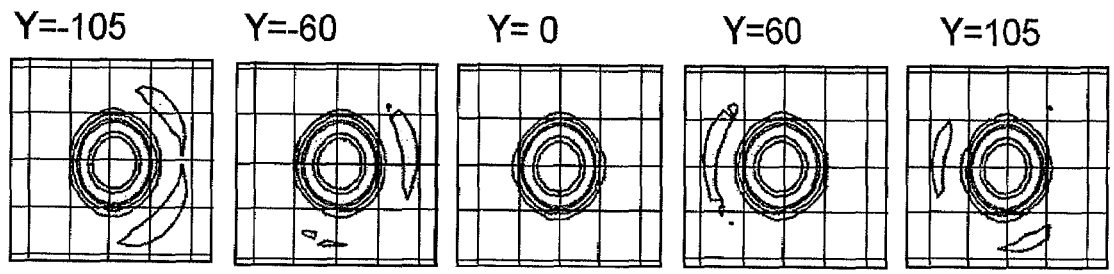
FIG. 26 is a diagram for explaining a spot profile of the third embodiment of the present invention.

FIG. 26 is a schematic diagram which illustrates the cross-sectional shapes of spots at different image heights. More specifically, FIG. 26 illustrates the sections sliced at 2%, 5%, 10%, 13.5%, 36.8% and 50% of the spot peak light quantity, at each image height.

Generally, in optical scanning devices in which a light beam is incident from an oblique direction within the sub-scan section, there occurs a phenomenon that the spot rotates due to distortion of the wavefront aberration.

In the present embodiment, such distortion of the wavefront aberration is reduced by optimizing the power disposition of the lens surfaces, tilt amount and shift amount of the lens, as well as the amount of curve of the meridional in the sub-scan direction.

With regard to the tilt amount of the imaging lens 16, when the point of intersection between the deflecting surface 5a and the principal ray of the incident light beam is taken as an origin, the lens is tilted by δ=9.7 degrees in the sub-scan direction around a coordinate (27.150, 0.300, 0.000), as shown by an arrow in FIG. 23.

Figure 27:
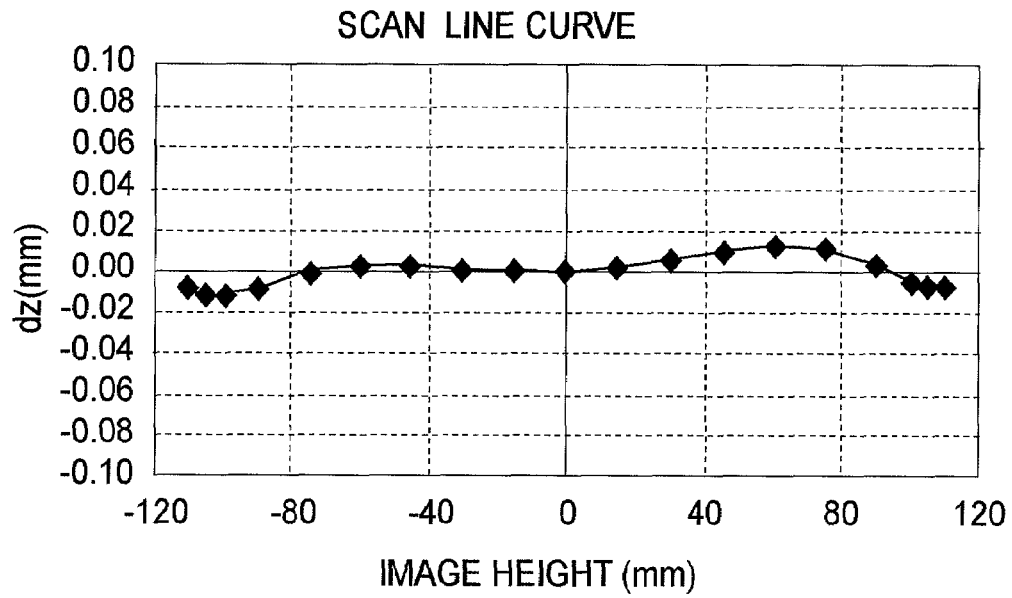
FIG. 27 is a graph depicting scan line bend of the third embodiment of the present invention.

FIG. 27 is a graph depicting the scan line curve which arrives at the scan surface, in the third embodiment of the present invention.

Generally, in monochromatic image forming apparatuses, the scan line curve should be controlled to less than 0.2 mm.

In the present embodiment, the scan line curve is held down to 0.024 mm which is a satisfactorily low level.

In this embodiment as described above, the light beam passed through the imaging lens 16 is turned back by the plane mirror 7 so that it again passes through the imaging lens 16. With this arrangement, the optical scanning device as a whole can be made compact.

In this embodiment, while a six-surface polygon mirror is used, the distance Lb from the end portion of optics box 11 shown in FIG. 22 to the scanned surface 8 is Lb=163.2 mm, and a very compact optical scanning device is realized like the abovementioned first embodiment.

The plane mirror 7 of the present embodiment comprises a flat surface mirror which has no power both in the main-scan direction and the sub-scan direction, as in the first and second embodiments. Hence, there is a relation $|øM/ø|=0$ and this satisfies conditional expression (1).

Furthermore, in the present embodiment, the angle α which is defined within the main-scan section and between the principal ray of the light beam incident on the image end portion and a plane perpendicular to the scanned surface 8 is α=24.4 deg. Also, the effective width W of the image is W=220 mm, and the distance L from the plane mirror 7 to the scanned surface 8 along the axial light beam is L=165.0 mm. Therefore, there is a relation $α·W/L=32.5$ and this satisfies conditional expression (2).

In the present embodiment, the tilt angle β in the sub-scan section is β=4.5 deg. as mentioned above, and this satisfies conditional expression (5).

With this arrangement, no interference occurs between the light beam and the mechanical components as seen from FIG. 23 and, furthermore, a well-ordered spot having reduced wavefront aberration such as shown in FIG. 26 is accomplished.

Furthermore, in the present embodiment as described above, the angle γ which is defined between the principal ray of the light beam from the input optical system LA and the optical axis of the imaging optical system LB is γ=70 deg. This satisfies conditional expression (6).

With this arrangement, there occurs no interference with the imaging lens 6 as seen from FIG. 22. Furthermore, use of six-surface polygonal mirror with a circumscribing radius of 20 mm having been used conventionally can be used conveniently.

Furthermore, in this embodiment, the components are so set as to satisfy conditional expression (3), as in the above-mentioned first embodiment.

Figure 28:
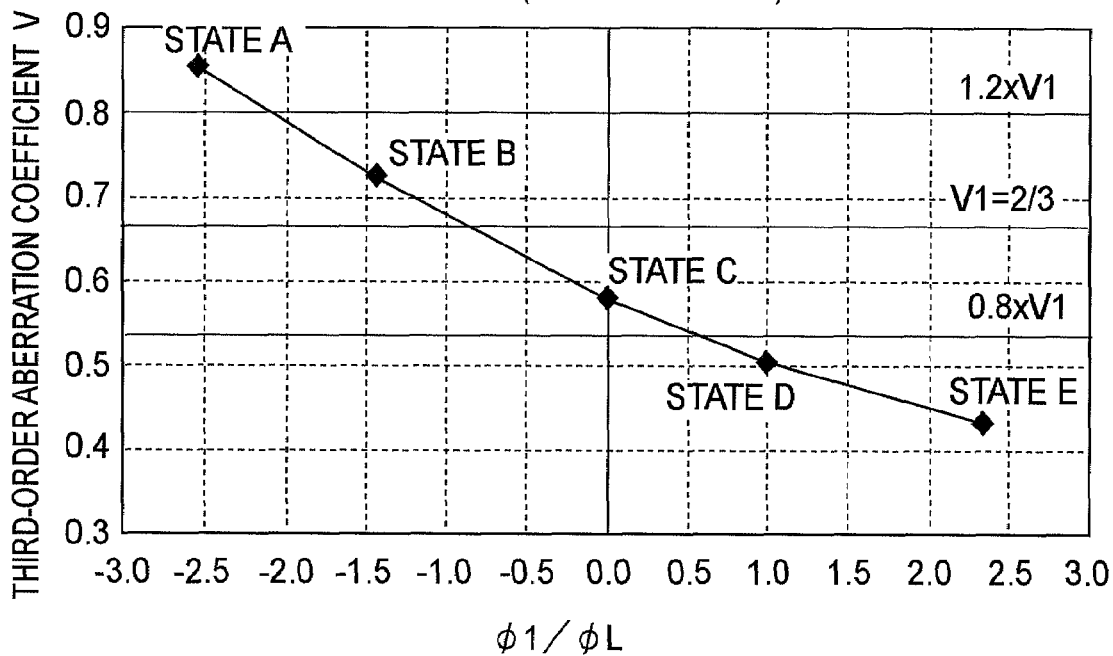
FIG. 28 is a graph illustrating the relationship between the power ratio and the third-order aberration coefficient V in the lens disposition of the third embodiment of the present invention.

FIG. 28 is a graph showing the results of calculation made with respect to the numerical example shown in the Table 3 or Table 4, wherein, while each lens surface position was fixed, the axial curvature radius was changed to cause a change of ø1/øL and the third-order aberration coefficient was calculated.

Figure 29:
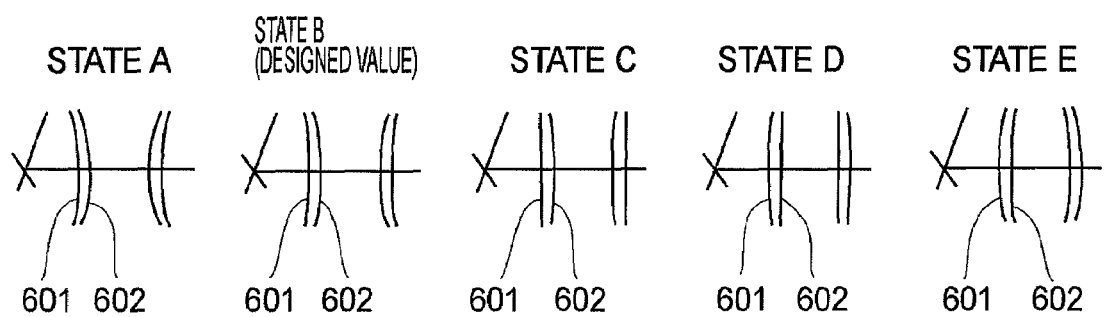
FIG. 29 is a diagram for explaining the lens shape according to the power ratio used in FIG. 28.

FIG. 29 is a main-scan sectional view based on axial curvature radius in different states, each diagram corresponding to a development view without a mirror.

In states A-C of FIG. 29, the lens surface 601 is concave and the lens surface 602 is convex. The state C corresponds to the state of design value.

In state D, the lens surface 601 is plane and the lens surface 602 is convex.

In state E, the lens surface 601 is convex and the lens surface 602 is plane.

In state F, the lens surface 601 is convex and the lens surface 602 is concave.

It is seen in FIG. 28 that, as the state changes from state A to state F, the value of third-order aberration coefficient decreases.

In the imaging optical system, it known that, as a theoretical value for securing the fθ characteristic, the third-order aberration coefficient V may be set to V=V1=⅔.

In state C (design value), it is seen that ø1/øL=−1.43 and V=0.725 which is very close to the theoretical value V1. Here, ø1/øL satisfies conditional expression (3).

Furthermore, in this embodiment like the first embodiment described hereinbefore, the light beam from the collimator lens 3 is made into a slow convergence light beam, by which the optical path length is shortened.

The convergence m in the present embodiment is m=0.239, and this satisfies conditional expression (4).

Figure 30:
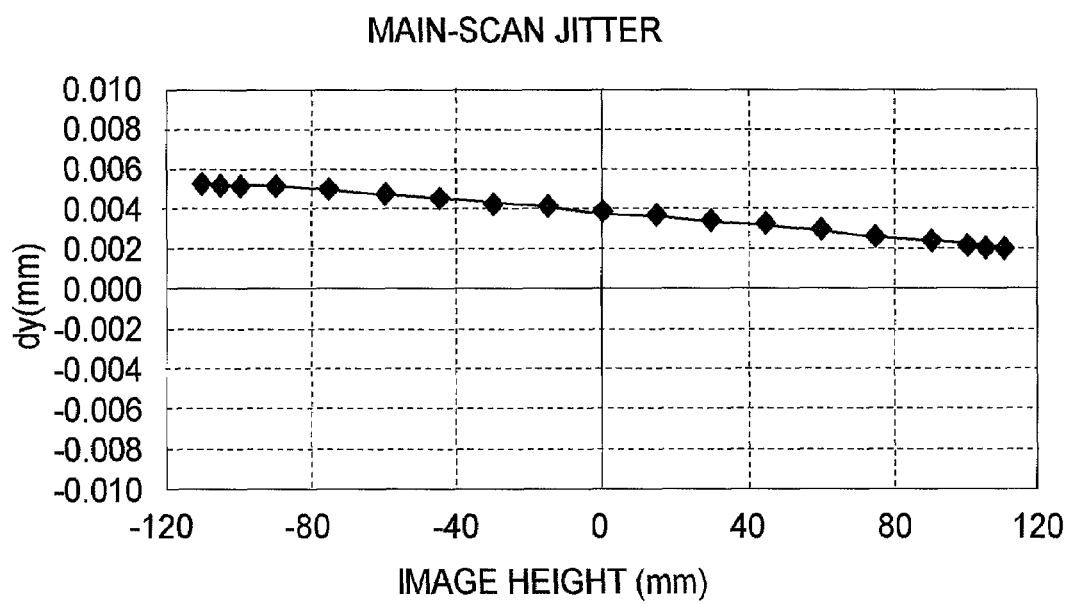
FIG. 30 is a graph depicting main-scan jitter of the third embodiment of the present invention.

FIG. 30 is a graph, illustrating jitter in the main-scan direction when a shift eccentric error of 10 μm was given to the deflecting surface.

As seen from FIG. 30, the jitter in the main-scan direction is of a magnitude 5.3 μm at the maximum, and it has been controlled to a satisfactory level causing no problem.

Subsequently, the multistage toric surface used in the present embodiment will be explained.

Figure 31:
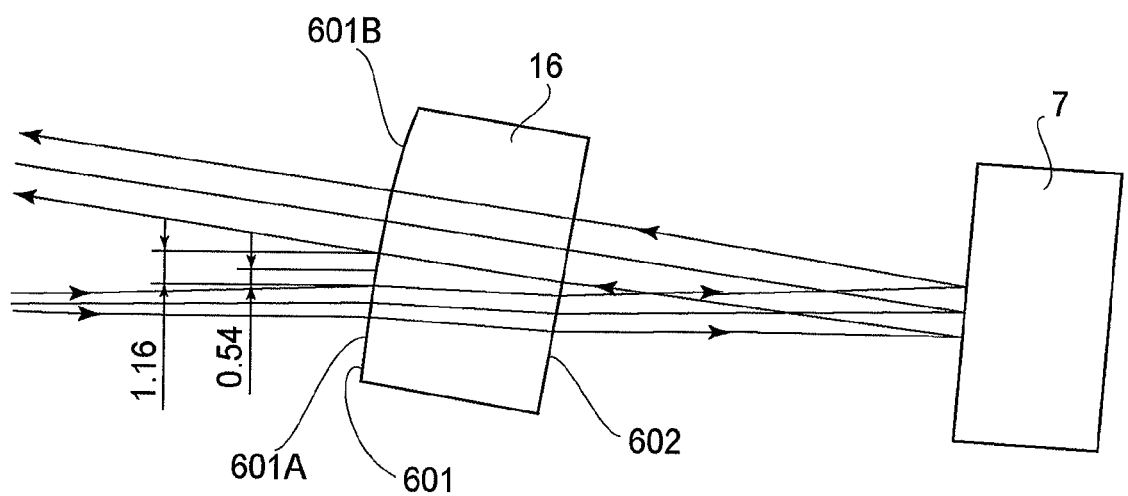
FIG. 31 is sectional view, along the sub-scan section, of an imaging lens member in the third embodiment of the present invention.

FIG. 31 is a sub-scan sectional view around the imaging lens 16.

The surface 601 at the optical deflector 5 side (not shown) is provided into an upper surface 601A (first transmission surface) and a lower surface 601B (fourth transmission surface) of different shapes, respectively, and the power in the sub-scan section is distributed more to the surface 601B side. By doing so, reduction of the sub-scan magnification of the imaging optical system LB is attempted.

In the present embodiment, the reason why the surface at the optical deflector 5 side, rather than the surface at the plane mirror 7 side, is formed by a multistage toric surface is that, as shown in FIG. 31, the distance between the light beam deflected by the optical deflector 5 and the light beam turned back by the plane mirror 7 is large.

The distance between the marginal light rays in the sub-scan direction is 1.16 mm, and they are spaced from the boundary point between the lens surface 601A and the lens surface 601B by about 0.5 mm, respectively.

Even if the influence of disposition error of optical components or peculiar characteristic produced during lens surface molding are taken into account, a space of around 0.5 mm is sufficient to avoid problems.

However, with regard to the surface at the plane mirror 7 side, the distance between the marginal light rays is 0.5 mm or less. Hence, it is difficult from the standpoint of manufacture to provide a multistage toric surface at this side.

Therefore, only the surface at the optical deflector 5 side is formed into a multistage toric surface, to thereby improve the design flexibility.

Figure 32:
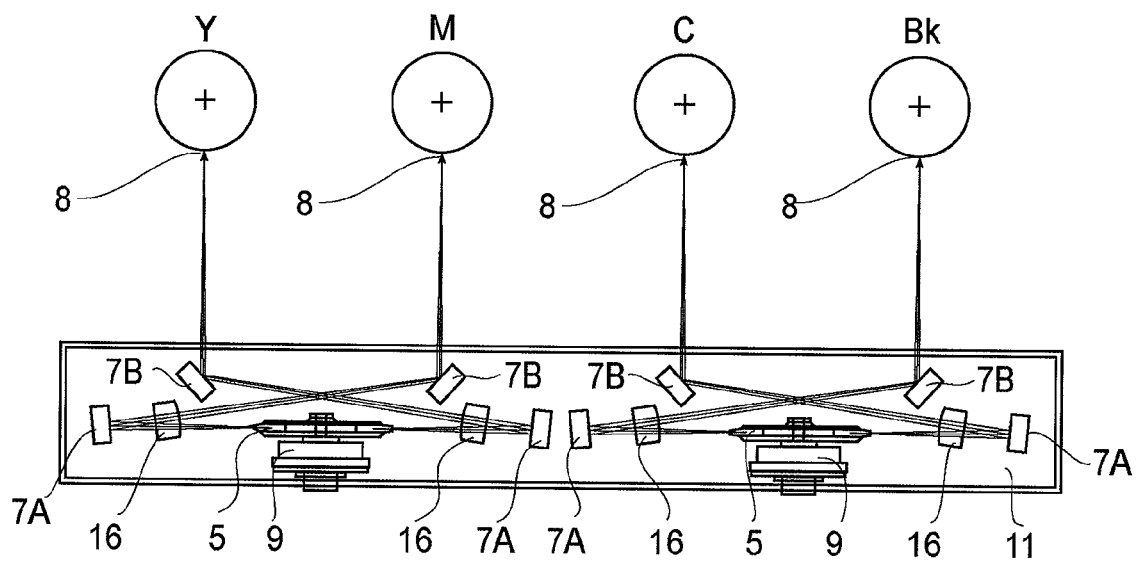
FIG. 32 is a sectional view of a main portion of a color image forming apparatus which uses an imaging optical system according to the third embodiment of the present invention.

FIG. 32 is a sub-scan sectional view wherein optical scanning devices according to the third embodiment of the present invention are disposed on the opposite sides of an optical deflector (polygonal mirror) 5, in an application to a color image forming apparatus.

In FIG. 32, like numerals are assigned to components corresponding to those of FIG. 21.

In FIG. 32, this example differs from the color image forming apparatus illustrated in FIG. 21 in that only one optics box 11 is used to reduce the number of structural components.

Other structures and optical functions are similar to those of the color image forming apparatus of FIG. 21, and similar advantageous results are obtainable.

In the color image forming apparatus shown in FIG. 32, the deflection light beam having been deflectively reflected by the optical deflector 5 passes through the imaging lens 16 and, thereafter, it is turned back by the plane mirror 7A so that it again passes through the imaging lens 16 in a reversed direction.

The light beam passed through the imaging lens 16 is turned back upwardly by the plane mirror 7B, and it is directed to photosensitive drum 8 (Y, M, C, Bk) which is the surface to be scanned.

With this structure, the distance from the photosensitive drum 8 to the optical scanning device (optics box 11) can be shortened, and further compactification is accomplished.

Embodiment of Image Forming Apparatus

Figure 33:
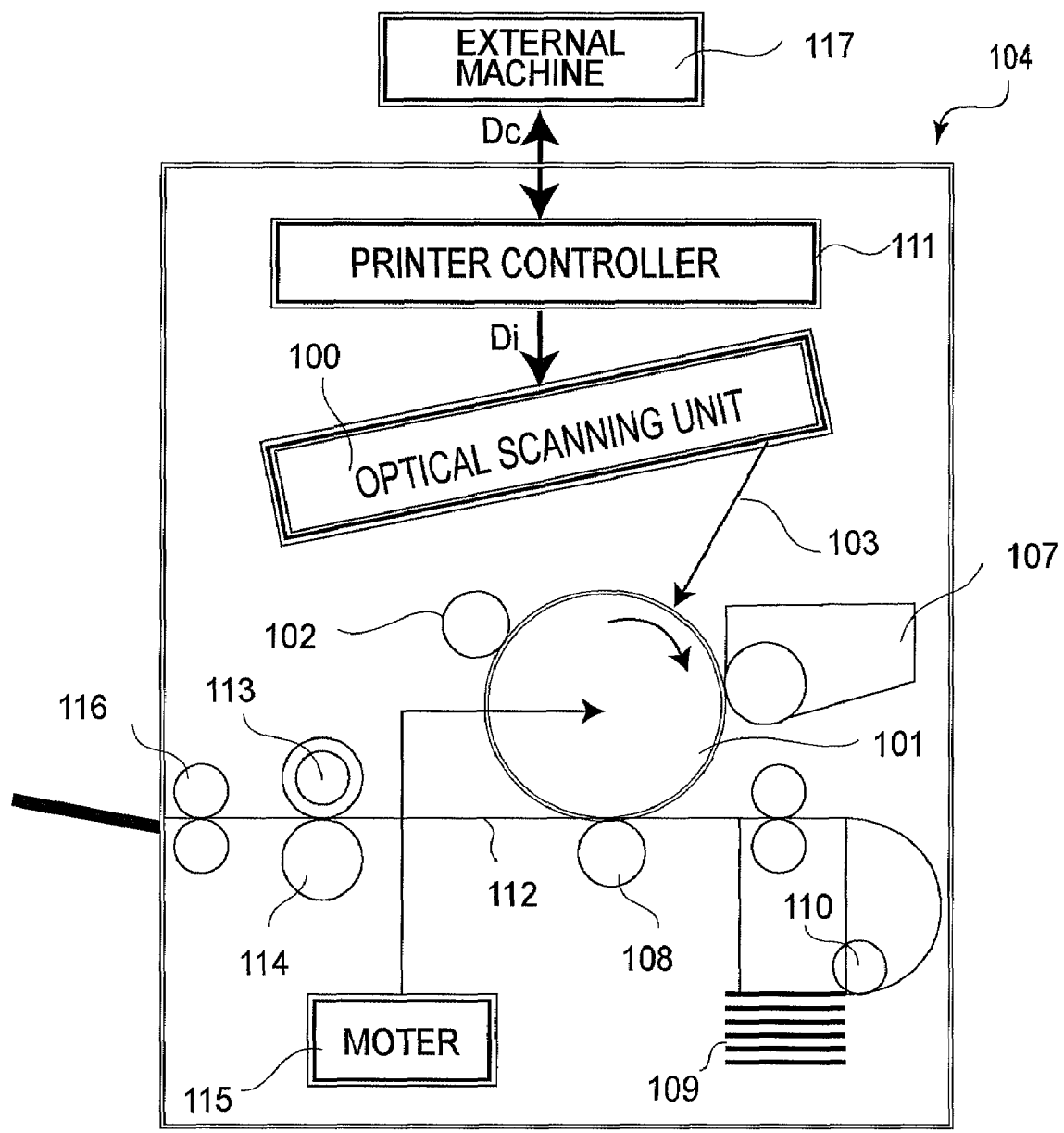
FIG. 33 is sectional view along the sub-scan section, showing an embodiment of an image forming apparatus according to the present invention.

FIG. 33 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit 100 which is configured in accordance with any one of the preceding embodiments described hereinbefore. The optical scanning unit 100 produces a light beam 103 having been modulated in accordance with the imagewise data Di, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 15) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 15) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 33, the print controller 111 has various functions in addition to the data conversion function described hereinbefore, such as for controlling a motor 115 or any other components inside the image forming apparatus as well as a polygon motor inside the optical scanning unit (to be described later).

There is no particular limitation with regard to the recording density of the image forming apparatus to be used in the present invention. However, since the higher the recording density is, the higher the required image quality is, the structures according to the first and second embodiments of the present invention will be more effective when they are introduced into an image forming apparatus of a resolution 1200 dpi or higher.

Embodiment of Color Image Forming Apparatus

Figure 34:
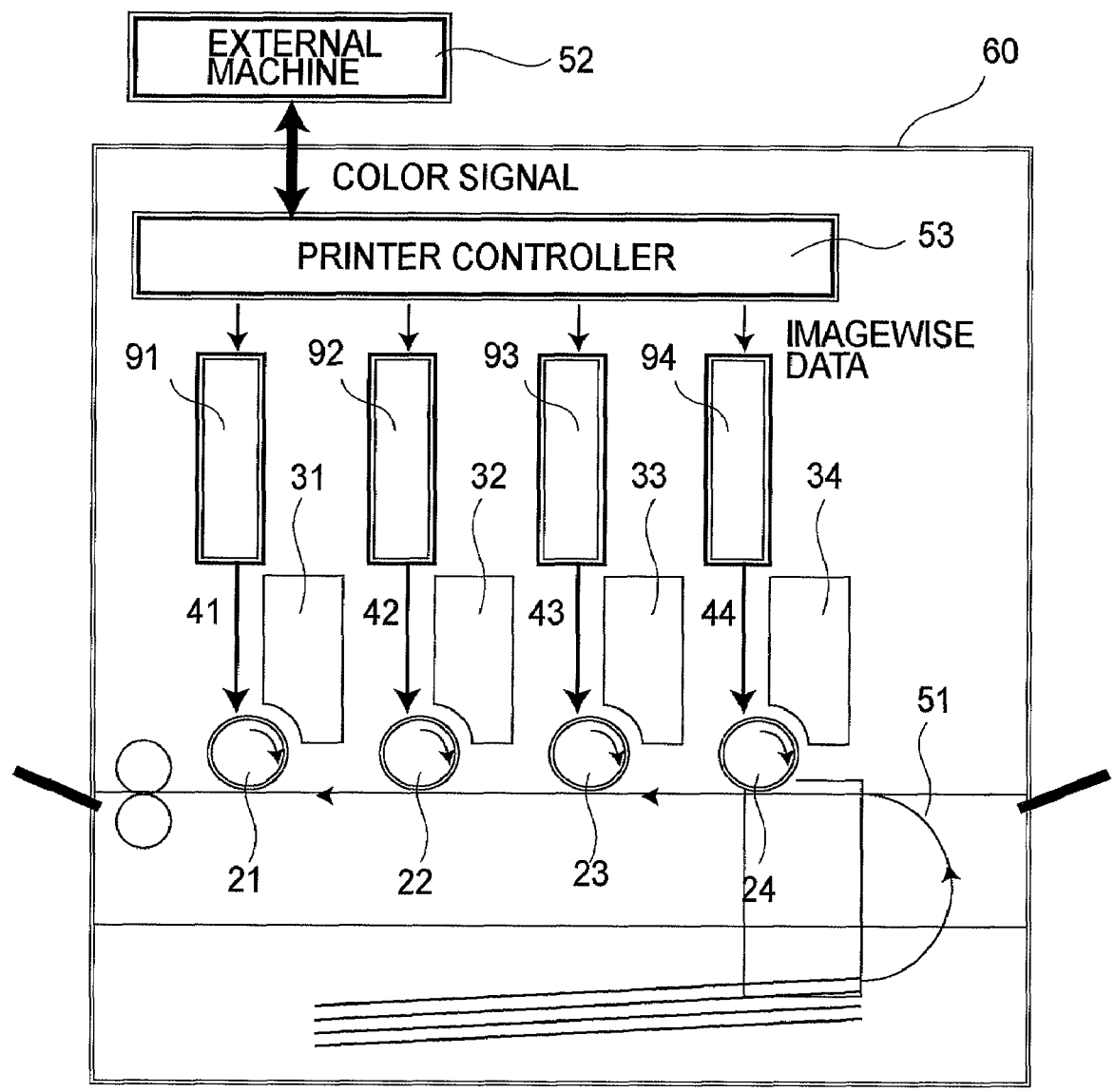
FIG. 34 is a schematic diagram of a main portion of a color image forming apparatus according to an embodiment of the present invention.
Figure 35:
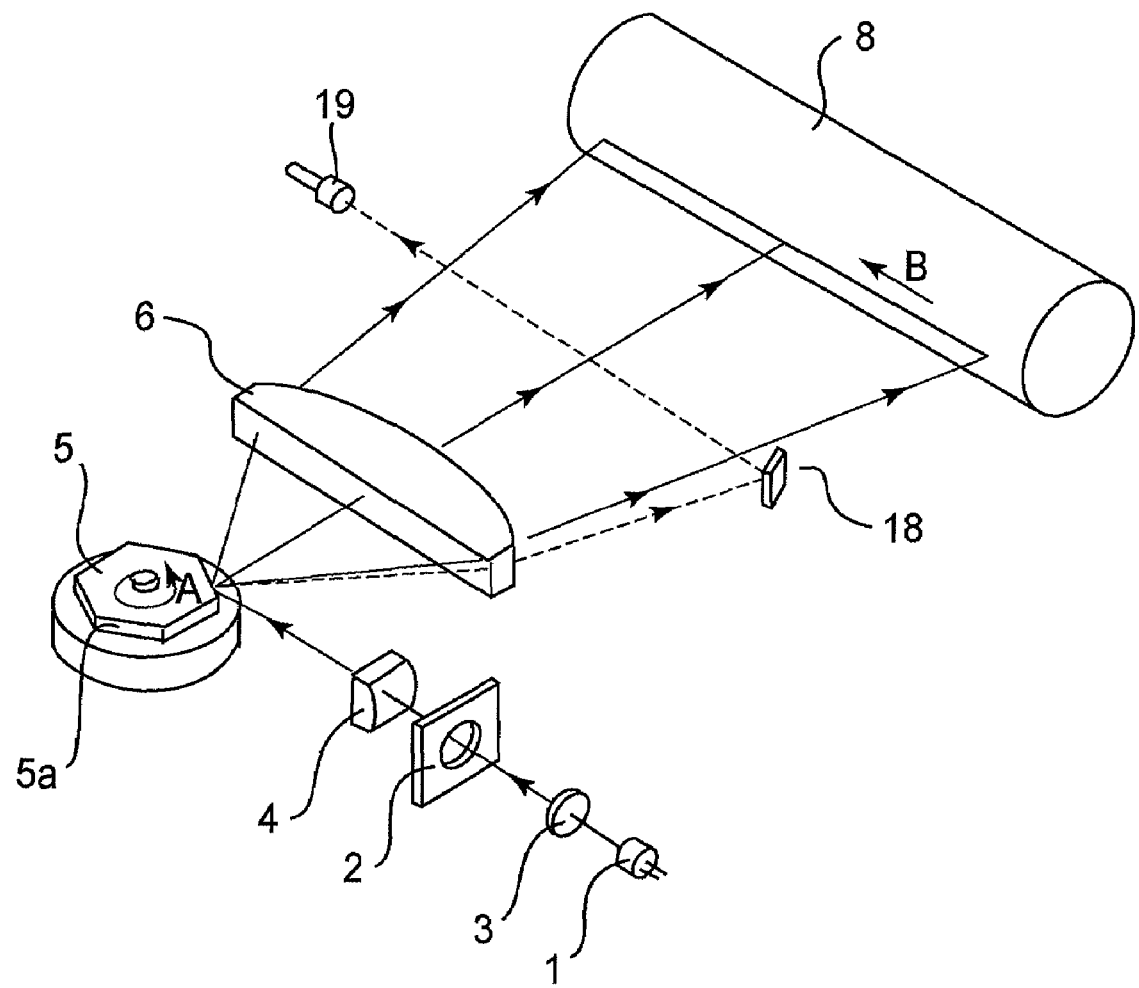
FIG. 35 is a perspective view of a main portion of a conventional optical scanning device.

FIG. 34 is a schematic view of a main portion of a color image forming apparatus according to an embodiment of the present invention. This embodiment is directed to a tandem type color image forming apparatus in which four optical scanning devices are provided so as to record imagewise data upon the surfaces of corresponding photosensitive drums (image bearing members) in parallel to each other.

In FIG. 34, denoted generally at 60 is a color image forming apparatus, and denoted at 91, 92, 93 and 94 are optical scanning devices having a structure according to any one of the preceding embodiments. Denoted at 21, 22, 23 and 24 are photosensitive drums (image bearing members), and denoted at 31, 32, 33 and 34 are developing devices, respectively. Denoted at 51 is a conveyance belt.

Although not shown in FIG. 34, the image forming apparatus further comprises a transfer device for transferring the toner image developed by the developing device to a transfer material, and a fixing device for fixing the transferred toner image on the transfer sheet.

In FIG. 34, the color image forming apparatus 60 receives color signals of R (red), G (green) and B (blue) supplied thereto from an outside machine 52 such as a personal computer, for example. These color signals are transformed by means of a printer controller 53 inside the image forming apparatus, into imagewise data (dot data) corresponding to C (cyan), M (magenta), Y (yellow) and B (black).

These imagewise data are inputted into the optical scanning devices 91, 92, 93 and 94, respectively. In response, these optical scanning devices produce light beams 41, 42, 43 and 44 having been modulated in accordance with the associated imagewise data. Through these light beams, the photosensitive surfaces of the photosensitive drums 21, 22, 23 and 24 are scanned in the main-scan direction.

In the color image forming apparatus of this embodiment, four optical scanning devices 91, 92, 93 and 94 are provided and these correspond to colors of C (cyan), M (magenta), Y (yellow) and B (black), respectively. These scanning devices are operable in parallel to each other to record imagewise signals upon the surfaces of the photosensitive drums 21, 22, 23 and 24, respectively, so that a color image can be printed at high speed.

As described, the color image forming apparatus of this embodiment uses four optical scanning devices 91, 92, 93 and 94 to produce latent images for different colors upon the surfaces of corresponding photosensitive drums 21, 22, 23 and 24, respectively, by use of light beams based on respective image data. After that, these images are superposedly transferred onto a recording sheet, whereby a single full-color image is produced thereon.

As regards the outside machine 52, a color image reading machine having a CCD sensor, for example, may be used. In that occasion, this color image reading machine and the color image forming apparatus 60 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2006-349557 filed Dec. 26, 2006, for which is hereby incorporated by reference.

What is claimed is:

1. An optical scanning device, comprising:
light source means;
deflecting means having a deflecting surface;
an input optical system configured to direct a light beam emitted from said light source means onto said deflecting means;
an imaging optical system configured to image a light beam scanningly deflected by the deflecting surface of said deflecting means upon a surface to be scanned, said imaging optical system having at least one imaging optical element of transmission type; and
at least one reflection type optical element having a reflecting surface and being disposed at an optical path between said imaging optical element of transmission type and said surface to be scanned;
wherein said imaging optical element of transmission type has first to fourth transmission surfaces and is configured so that the light beam scanningly deflected by the deflecting surface of said deflecting means passes through said imaging optical element of transmission type in an order from the first transmission surface to the second transmission surface, and that, after being reflected by the reflecting surface of said reflection type optical element, the light beam subsequently passes again through said imaging optical element of transmission type in an order from the third transmission surface to the fourth transmission surface,
wherein the transmission surface of said at least one imaging optical element through which the light beam passes again has an axial combined power ø within a main-scan section, while the reflecting surface of said at least one reflection type optical element has an axial combined power øM within a main-scan section of the reflecting surface, which axial combined powers satisfy a relation $$|øM/ø|<0.1$$

and, wherein the axial combined power within a main-scan section of the transmission surface of said imaging optical element through which the light beam passes again is comprised of combined powers of four optical surfaces which include the first transmission surface on which the light beam scanningly deflected by the deflecting surface of said deflecting means is incident, the second transmission surface on which the light beam passed through the first transmission surface is incident, the third transmission surface on which the light beam reflected by the reflecting surface of said reflection type optical element is incident, and the fourth transmission surface on which the light beam passed through the third transmission surface is incident.

2. An optical scanning device according to claim 1, wherein said reflection type optical element is comprised of a plan mirror.

3. An optical scanning device according to claim 1, wherein, when an effective width of an image on said surface to be scanned in a main-scan direction is denoted by W (mm), a distance to said surface to be scanned from said reflection type optical element which is optically farthest from said surface to be scanned is denoted by L (mm), and an angle which is defined within the main-scan section and between a principal ray of a light beam incident on an image end portion on said surface to be scanned and a normal which is perpendicular to said surface to be scanned is denoted by α (deg), a relation $$20°<α·W/L<100°$$

is satisfied.

4. An optical scanning device according to claim 1, wherein said optical scanning device has only one imaging optical element of transmission type through which the light beam passes again.

5. An optical scanning device according to claim 1, wherein the surface, at the deflecting means side, of said imaging optical element of transmission type through which the light beam passes again has different powers with respect to the sub-scan section, the power being different between a position where the light beam deflected by the deflecting surface of said deflecting means passes and a position where the light beam reflected by the reflecting surface of said reflection type optical element passes.

6. An optical scanning device according to claim 1, wherein the first transmission surface and the third transmission surface of said imaging optical element of transmission type through which the light beam passes again have a shape in the main-scan section which is defined based on one function, and wherein the second transmission surface and the fourth transmission surface of said imaging optical element of transmission type have a shape in the main-scan section which is defined based on one function.

7. An optical scanning device according to claim 1, wherein the first transmission surface and the second transmission surface of said imaging optical element of transmissions type through which the light beam passes again have an axial combined power øL in the main-scan section, while the first transmission surface of said imaging optical element of transmission type through which the light beam passes again has an axial power ø1 in the main-scan section, and wherein a relation $$-2.0<ø1/øL<0.5$$

is satisfied.

8. An optical scanning device according to claim 1, wherein said imaging optical element of transmission type through which the light beam passes again has a transmission surface with a sign of curvature, in the main-scan section, which sign is inverted within an effective diameter.

9. An optical scanning device according to claim 8, wherein the transmission surface of said imaging optical element of transmission type with an inverting sign has an axial shape which is convex facing to the deflecting means side.

10. An optical scanning device according to claim 1, wherein, when a distance in the main-scan section from a rear principal plane of said imaging optical system to said surface to be scanned is denoted by Sk (mm), a focal length of said imaging optical system within the main-scan section is denoted by f (mm), and m=1−Sk/f, a relation $$-0.1<m<0.5$$

is satisfied.

11. An optical scanning device according to claim 1, wherein, within the sub-scan section, the light beam from said input optical system is perpendicularly incident on the deflecting surface of said deflecting means.

12. An optical scanning device according to claim 1, wherein, when an angle which is defined in the sub-scan section and between a rotational axis of said deflecting means and the reflecting surface of said reflection type optical element is denoted by β (deg), a relation $$2°≦β≦10°$$

is satisfied.

13. An optical scanning device according to claim 1, wherein, when an angle which is defined in the main-scan section and between an optical axis of said imaging optical system and a principal ray of the light beam incident on the deflecting surface of said deflecting means is denoted by γ (deg), a relation $$60°≦γ≦90°$$

is satisfied.

14. An image forming apparatus, comprising:
an optical scanning device as recited in claim 1;
a photosensitive material disposed at a scan surface to be scanned;
a developing device for developing an electrostatic latent image formed on said photosensitive material though a light beam scanned by said optical scanning device, to produce a toner image;
a transferring device for transferring the developed toner image onto a transfer material;
a fixing device for fixing the transferred toner image, on the transfer material; and
a printer controller for converting code data supplied from an outside machine into an imagewise signal and for inputting the imagewise signal into said optical scanning device.

* * * * *